US012050526B2

(12) United States Patent
Wannamaker et al.

(10) Patent No.: US 12,050,526 B2
(45) Date of Patent: Jul. 30, 2024

(54) USER FEEDBACK MECHANISM FOR SOFTWARE APPLICATIONS

(71) Applicant: AUTODESK, INC., San Francisco, CA (US)

(72) Inventors: Kendra Ann Wannamaker, Etobicoke (CA); Justin Frank Matejka, Newmarket (CA); Jo Karel Vermeulen, East York (CA); George Fitzmaurice, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 99 days.

(21) Appl. No.: 17/969,555

(22) Filed: Oct. 19, 2022

(65) Prior Publication Data

US 2023/0333962 A1    Oct. 19, 2023

Related U.S. Application Data

(60) Provisional application No. 63/332,651, filed on Apr. 19, 2022.

(51) Int. Cl.
G06F 11/36    (2006.01)
G06F 11/34    (2006.01)

(52) U.S. Cl.
CPC ...... *G06F 11/3604* (2013.01); *G06F 11/3476* (2013.01)

(58) Field of Classification Search
CPC ............ G06F 11/3604; G06F 11/3476
See application file for complete search history.

(56) References Cited

U.S. PATENT DOCUMENTS

| 9,448,916 | B2 * | 9/2016 | Browne | G06F 11/3604 |
| 11,809,271 | B1 * | 11/2023 | Wang | G06F 11/008 |
| 2005/0223282 | A1 * | 10/2005 | Frey | G06F 11/3476 |
| | | | | 714/E11.204 |

(Continued)

FOREIGN PATENT DOCUMENTS

| CA | 2701969 A1 * | 10/2010 | ......... G06F 11/0709 |
| EP | 1118795 A1 * | 7/2001 | ............... F16G 5/16 |
| WO | WO-2013041345 A1 * | 3/2013 | ....... G06F 17/30994 |

*Primary Examiner* — Matthew M Kim
*Assistant Examiner* — Indranil Chowdhury
(74) *Attorney, Agent, or Firm* — Artegis Law Group, LLP

(57) ABSTRACT

A feedback mechanism that reports software issues between users of software applications and the developers of the software applications. The feedback mechanism generates feedback logs that capture moments of user frustration at the moment a user encounters issues with using a particular software application executing on a client device. The feedback mechanism is triggered to generate a feedback log by the user via a predetermined set of user inputs. Once generated, the feedback log captures an associated importance level, a user description, and/or context information (such as application and command activity information) for the particular software application and one or more other software applications that interacted with the particular software application executing on the client device. The feedback log can also capture multimedia content such as audio, images, and videos. The feedback log is then transmitted to a server of a developer of the particular software application.

20 Claims, 10 Drawing Sheets

(56) References Cited

U.S. PATENT DOCUMENTS

| | | | |
|---|---|---|---|
| 2005/0261878 A1* | 11/2005 | Shrivastava | G06F 11/0715 702/186 |
| 2007/0299631 A1* | 12/2007 | Macbeth | G06F 11/3476 702/182 |
| 2008/0284729 A1* | 11/2008 | Kurtenbach | G06F 3/038 345/156 |
| 2010/0229112 A1* | 9/2010 | Ergan | G06F 11/0769 715/764 |
| 2012/0221712 A1* | 8/2012 | Sullivan | H04L 51/234 709/224 |
| 2012/0311538 A1* | 12/2012 | Bhatia | G06F 11/32 717/126 |
| 2015/0242431 A1* | 8/2015 | Vlcek | G06Q 50/01 707/753 |
| 2018/0032601 A1* | 2/2018 | Venkataraman | G06F 16/285 |
| 2018/0217911 A1* | 8/2018 | Wilding | G06F 11/3476 |
| 2018/0275986 A1* | 9/2018 | Ghosh | G06F 8/60 |
| 2019/0327160 A1* | 10/2019 | Sivaprakasam | G06F 11/3672 |
| 2021/0026676 A1* | 1/2021 | Sharma | G06F 11/302 |
| 2021/0055943 A1* | 2/2021 | Hinton | G06F 9/544 |
| 2021/0193297 A1* | 6/2021 | Buckland | G16H 40/20 |
| 2022/0066998 A1* | 3/2022 | Jha | G06N 7/01 |
| 2022/0156173 A1* | 5/2022 | Chandrasekaran | G06F 11/3476 |
| 2022/0318319 A1* | 10/2022 | Vishny | G06F 16/951 |
| 2023/0401139 A1* | 12/2023 | Casati | G06F 11/3476 |

* cited by examiner

USER FEEDBACK MECHANISM FOR SOFTWARE APPLICATIONS

CROSS-REFERENCE TO RELATED APPLICATIONS

This application claims the priority benefit of United States provisional patent application titled, "TECHNIQUES FOR DETECTING AND TRACKING FRUSTRATION WHEN USING SOFTWARE APPLICATIONS," filed on Apr. 19, 2022 and having Ser. No. 63/332,651. The subject matter of this related application is hereby incorporated herein by reference.

BACKGROUND

Field of the Various Embodiments

The various embodiments relate generally to computer science and software engineering and, more specifically, to a user feedback mechanism for software applications.

DESCRIPTION OF THE RELATED ART

Advances in computer and software engineering have significantly increased the complexity of many of the software applications that are implemented for various workflow tasks. One result of these increases in software application complexity is that users oftentimes have trouble learning or using software applications and experience moments of frustration when performing workflow tasks using software applications. For example, when performing a workflow for a particular task (such as reformatting and inserting an image), the user could have to use a first application to perform a first operation associated with the task (such as creating the image), a second application to perform a second operation associated with the task (such as converting the image to a different format), and a third application to perform a third operation associated with the task (such as inserting the reformatted image into a document created using the third application). In such a scenario, the user could experience problems and moments of frustration when using any of the applications and/or when performing any of the operations associated with the task. For example, the user could have difficulty creating the image using the first application, could not know how to reformat the image to a desired format in the second application, and/or could be unable to move the reformatted image from the second application to the third application or insert the reformatted image into the document created using the third application. Because user feedback is important to developing useful and robust software applications, companies and software developers, as a general matter, want to receive feedback from users delineating any problems and/or moments of frustration experienced when using software applications. Such feedback can be invaluable for companies and software developers with respect to improving current software applications/products and for developing future software applications/products.

One conventional approach to obtaining information about software application performance includes generating error reports when software applications crash unexpectedly. The error reports oftentimes include context information about the particular software application that crashed unexpectedly and typically are automatically generated by the actual software application in response to the unexpected crash. In other approaches, questionnaires and product rating surveys are used to obtain feedback directly from users about software application performance and usability. For example, a software application could be configured to automatically query a user to fill out a questionnaire that has detailed questions about the overall user experience and level of satisfaction after a particular software application interaction is completed, such as when a user ends a videoconference or closes a document. In another example, a software application could be configured to automatically query a user to fill out a product rating survey of the software application after a particular software application interaction is completed.

One drawback of the above conventional approaches is that these approaches normally capture feedback for only a single software application and are not designed to capture feedback for multiple software applications, such as the multiple applications that are implemented for a workflow for a given task. For example, an error report captures context information for only the particular software application that crashes and does not capture context information for any of the other software applications implemented for a given workflow task. Similarly, a questionnaire or a product rating survey provides information about only the particular software application that queries the user for the questionnaire or product rating and does not provide any information about any of the other software applications with which the user also interacted to perform the given workflow task. Consequently, conventional approaches do not provide any feedback or information about the operations and interactions between the multiple software applications that typically are implemented for a given workflow task, which reduces the ability of companies and software developers to improve the interactions between software applications implemented in various workflows.

Another drawback of the above approaches is that the user lacks autonomy as to when the feedback or information mechanism is triggered. For example, error reports usually are generated automatically by the software application and only when a software error or software application failure is detected. Error reports cannot be triggered by the user. Similarly, a software application is typically triggered to query a user to fill out a questionnaire or product rating survey in response to a particular software application interaction being completed. Again, questionnaires and product rating surveys are not typically triggered by the user. Consequently, conventional approaches are not effective at capturing user feedback at the moment a problem with a software application arises or when a user experiences frustration with the software application, which reduces the accuracy, quality, and quantity of the feedback received by companies and software developers about their software applications.

A further drawback of the above approaches is that the feedback received about a given software application typically includes only text-based feedback. In this regard, error reports, questionnaires, and product rating surveys typically include only text-based feedback about the performance of various software applications and do not include any multimedia-based feedback. Consequently, conventional approaches reduce the quality and quantity of the feedback received by companies and software developers about their software applications.

As the foregoing illustrates, what is needed in the art are more effective techniques for obtaining information about software applications that are implemented for workflow tasks.

SUMMARY

Various embodiments include a computer-implemented method for generating feedback logs for software applications executing on client devices. The computer-implemented method includes querying an operating system for context information associated with a plurality of software applications executing on a client device. The computer-implemented method also includes storing the context information within a context data structure and receiving a first instance of a predetermined set of inputs via an input device. The computer-implemented method further includes in response, generating a feedback log that is populated with at least a portion of the context information stored within the context data structure. The computer-implemented method also includes transmitting the feedback log to a server machine.

At least one technical advantage of the disclosed techniques relative to the prior art is that the disclosed techniques enable a feedback log to be generated that includes context information (such as a set of recent commands) that is associated with multiple software applications executing on a client device. After the feedback log is generated, the feedback log can be transmitted to a server machine associated with a company or software developer that is responsible for at least one of software applications executing on the client device. In this manner, companies and software developers are able to receive valuable information and insights about the operations and interactions between their software applications and other software applications. Thus, the disclosed techniques increases the ability of the software developer/company to improve the interactions between their software applications and other software applications relative to prior approaches that cannot capture context information for multiple software applications. Another technical advantage of the disclosed techniques relative to the prior art is that the disclosed techniques provide a feedback mechanism that can be triggered by the user to generate a feedback log via a predetermined set of user inputs. Consequently, the disclosed techniques are capable of capturing user feedback at the very moment the user experiences a frustrating problem/issue with a software application, which increases the accuracy, quality, and quantity of the feedback received by the software developers, thus increasing the ability of the software developers/companies to improve their software applications relative to prior approaches. Another technical advantage of the disclosed techniques relative to the prior art is that the disclosed techniques provide a feedback mechanism that generates a feedback log that can include multimedia content, such as images and videos. Consequently, the disclosed techniques are capable of capturing more detailed and rich user feedback than conventional approaches that capture only text-based user feedback, thereby increasing the ability of the software developers/companies to improve their software applications relative to prior approaches. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Feedback System

Figure 1:
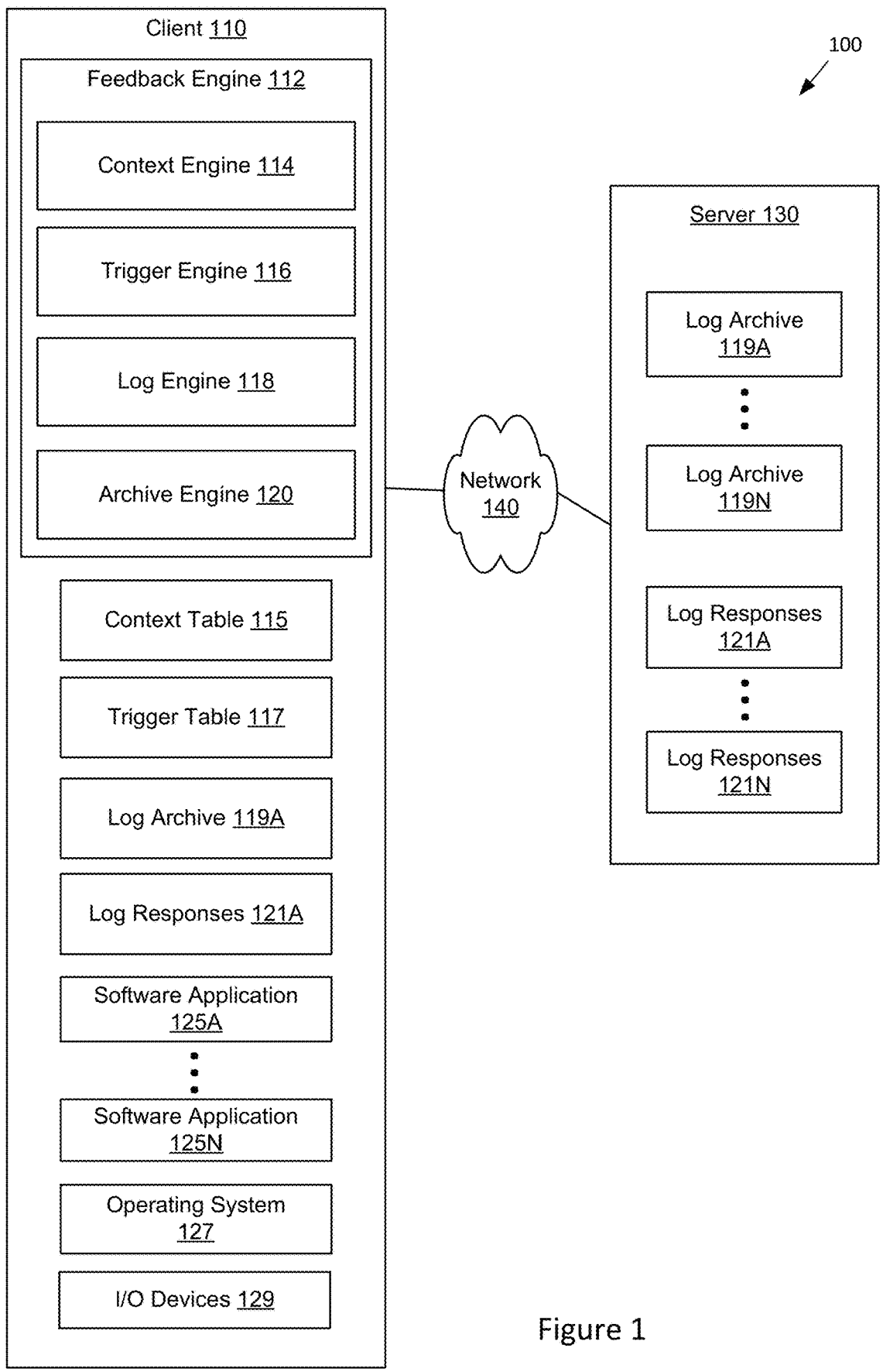
FIG. 1 illustrates a system configured to implement one or more aspects of the various embodiments.

FIG. 1 illustrates a system configured to implement one or more aspects of the various embodiments. As shown, the feedback system 100 includes a client 110 and a server 130 coupled via a network 140. The feedback system 100 can also include additional clients 110 (not shown) connected to the server 130 via the network 140. The client 110 is associated with and corresponds to a particular user who operates the client 110. The network 140 can comprise any technically feasible communications or information network, wired or wireless, that allows data exchange, such as a wireless (Wi-Fi) network, personal area network (such as Bluetooth, Wireless USB, IrDA, etc.), wide area network (WAN), a local area network (LAN), and/or the Internet, among others.

The client 110 can comprise a computing device or machine, such as a desktop computer, laptop computer, mobile device, or any other type of computing device suitable for practicing various embodiments. The server 130 can comprise a computing device or machine, such as a server system, desktop computer, or any other type of computing device suitable for practicing various embodiments. The client 110 and server 130 comprise computer hardware components such as memory for storing software application(s) and data and processors that execute the software application(s) to provide processing engines that enable the operations and functions described herein. The computer hardware components of the client 110 and server 130 are discussed below in relation to FIGS. 9-10.

The client 110 executes a feedback engine 112 for performing embodiments herein. The feedback engine 112 can include a context engine 114, a trigger engine 116, a log engine 118, and an archive engine 120. The client 110 also stores various data for performing embodiments herein, such as a context table 115, a trigger table 117, a log archive 119A, and a set of log responses 121A. In general, the context table 115 and the trigger table 117 can comprise any type of data structure for storing data.

The client 110 also executes a plurality of software applications 125 (e.g., 125A-125N). In some embodiments, each software application 125 in the plurality of software applications 125 comprises a different and separate software application 125 and does not comprise different instances of a same software application 125. In some embodiments, the plurality of software applications 125 can comprise a platform of related but different software applications 125 from a same software developer/company. In other embodiments, the plurality of software applications 125 can comprise different software applications 125 from different software developers/companies.

In some embodiments, a user performs a particular workflow task by using the plurality of software applications 125 that involves interactions between the plurality of software applications 125. For example, when performing a workflow for performing a particular task (such as reformatting and inserting an image), the user can implement a first application for performing a first operation (such as creating the image), a second application for performing a second operation (such as converting the image to a different format), and a third application for performing a third operation (such as inserting the reformatted image into a document in the third application). In some embodiments, two software applications 125 interact with one another when an operation of the workflow task involves the two software applications 125, such as inserting an item from one application into a document of another application.

The plurality of software applications 125 can include a primary application and one or more secondary applications with which the primary application interacts. The primary application can comprise a software product of a primary developer/company, and the one or more secondary applications can comprise software products of the primary developer/company and/or one or more different developers/companies. In these embodiments, the feedback engine 112 generates and transmits feedback logs to a server 130 that is owned and/or operated by the primary developer/company that produces the primary application. The feedback logs can include context information for the primary application and the one or more secondary applications. Thus, although the feedback logs can include context information for secondary applications that are not developed by the primary developer/company, the feedback logs can advantageously provide feedback and insight as to how well the primary application interacts with secondary applications developed by other developers/companies. Therefore, the feedback logs can be used by the primary developer/company to improve the interactions between the primary application and other applications to develop a seamless user experience.

The client 110 also executes an operating system 127 and includes I/O devices 129. The I/O devices 129 include input devices capable of receiving user inputs, such as a keyboard, a mouse, a trackball, a camera for inputting images and/or video, a microphone for inputting audio, and so forth, as well as output devices capable of providing output, such as a display, speaker, and so forth. Additionally, I/O devices can include devices capable of both receiving input and providing output, such as an augmented reality (AR) system, virtual reality (VR) system, touchscreen, a universal serial bus (USB) port, and so forth.

As discussed above, the client 110 executes a feedback engine 112 that includes a context engine 114, a trigger engine 116, a log engine 118, and an archive engine 120. The context engine 114 can continuously interact in the background with the operating system 127 of the client 110 to continuously aggregate/collect context information for the multiple software applications 125 executing on the client 110. The collected context information is stored to the context table 115. For example, the context information can include a list of open/executing software applications (such as the multiple software applications 125) and a set of executed commands for each software application, along with associated timestamps. The aggregate/collected context information and the context table 115 are discussed in detail below in relation to FIG. 2.

The context engine 114 is configured to continuously query the operating system 127 in the background to continuously collect context information for the multiple executing software applications 125 using computer permissions and accessibility access. In particular, the context engine 114 can utilize operating system (OS) specific software development kits (SDK's) and third-party frameworks, such as Electron, to query and collect context information from the operating system 127.

In prior approaches, the feedback mechanism is typically incorporated into the software application 125 itself, and therefore collects context information from only the software application 125. However, conventional feedback mechanisms are typically incapable of collecting context information from other different software applications 125 that are also executing on the client 110. Consequently, conventional feedback mechanisms are incapable of providing feedback for interactions between multiple software applications 125 used to perform a workflow task. Advantageously, the feedback engine 112 of the disclosed techniques comprises a background feedback application that is external to and operates independently from each of the multiple software applications 125 executing in the foreground on the client 110. In addition, the feedback engine 112 interacts with the operating system 127 of the client 110 to collect context information, which enables the feedback engine 112 to collect context information for all software applications 125 executing on the client 110, instead of collecting context information that is application specific as in prior approaches. Consequently, the disclosed feedback engine 112 is capable of providing feedback for interactions between multiple software applications 125 used to perform a workflow task, which provide technological advancements over prior art approaches.

While the context engine 114 continuously aggregates/collects and stores context information in the background, the trigger engine 116 continuously monitors the user inputs received by the client 110 via the input devices (such as a keyboard or mouse) to determine whether a predetermined set of user inputs is received. For example, the trigger engine 116 can continuously monitor a bus coupled to the input devices to analyze input packets received from the input devices to detect the predetermined set of user inputs. Receiving the predetermined set of user inputs indicates that the user is experiencing a problem/issue with the primary application at the moment and wishes to trigger the feedback engine 112 to generate a new feedback log for the primary application. In some embodiments, there are one or more predetermined triggers that can initiate the feedback engine 112 to generate a new feedback log, each predetermined trigger corresponding to a predetermined set of user inputs that are specified in the trigger table 117. The predetermined triggers of the feedback engine 112 are discussed in detail below in relation to FIG. 3.

In response to detecting that a predetermined set of user inputs (a predetermined trigger) has been received, the trigger engine 116 initiates the log engine 118 for generating a new feedback log and populating the new feedback log with various types of content. Upon being initiated, the log engine 118 generates a new feedback log that is displayed via a log user interface. The log user interface includes an importance level indicator, a user description section, a context section, and a multimedia section. The importance level indicator visually illustrates the importance level of the new feedback log from a lowest level (such as 1) to a highest level (such as 10) based on user inputs. The user description section of the log user interface is configured to receive the user's text description of the particular problem/issue that the user is currently experiencing with the primary application. The context section of the log user interface displays various selectable icons for adding various context information for the software applications 125 to the new feedback log, such as a list of open/executing software applications 125 and a set of commands executed by each open/executing software application 125. The multimedia section of the log user interface displays various selectable icons for adding different types of multimedia content to the new feedback log, such as audio, an image, and/or a video clip with audio commentary.

Thus, the new feedback log can be populated with various types of content, including an importance level, a user description that is manually entered by the user, context information that is automatically collected by the context engine 114, and/or multimedia content. The log user interface also displays a save icon that the user can select for storing the new feedback log to a log archive 119A stored on the client 110 once the user is satisfied with the content included in the new feedback log. In response to receiving a selection of the save icon, the log engine saves the new feedback log to the log archive 119A and initiates the archive engine 120.

When initiated, the archive engine 120 generates and displays an archive user interface for displaying and reviewing archived feedback logs. The archive user interface can initially display an overview window that includes a plurality of selectable time-period icons, each time-period icon representing a particular time period and a group of feedback logs that were generated during the particular time period. When the user selects a particular time-period icon representing a particular time period and group of feedback logs, the archive engine 120 displays a group window that displays a plurality of selectable log icons representing the feedback logs included in the group of feedback logs. Each log icon represents a particular feedback log included in the selected group of feedback logs. When the user selects a particular log icon representing a particular feedback log, the archive engine 120 displays a log window that displays the various content of the particular feedback log, including the assigned/associated importance level value, a user text description, context information, and/or multimedia content.

In some embodiments, the archive engine 120 transmits one or more feedback logs to a server 130 that is owned and/or operated by the primary developer/company based on the importance levels associated with the one or more feedback logs. For example, the archive engine 120 can periodically transmit a group of feedback logs to the server at predetermined intervals based on the importance levels associated with the group of feedback logs. For example, the group of feedback logs can be ordered based on the assigned/associated importance levels. As another example, the archive engine 120 can periodically transmit only those feedback logs in the group of feedback logs having associated importance levels that exceed a predetermined threshold importance level (such as 7 on a scale of 1 to 10). As a further example, the archive engine 120 can immediately transmit a feedback log having an associated importance level that equals the highest possible importance level (such as 10 on a scale of 1 to 10).

In this manner, the feedback engine 112 can flag/highlight those feedback logs having relatively high importance levels to the primary developer/company. In some embodiments, a feedback log having an assigned/associated importance level that exceeds a threshold importance level indicates to the primary developer/company that the user wishes to receive a log response from the primary developer/company regarding the feedback log. The log responses received from the server 130 of the primary developer/company are stored to the set of log responses 121A on the client 110, which can be displayed on the client 110 and reviewed by the user. Therefore, submitting the feedback logs to the server 130 can advantageously benefit both the primary developer/company and the user.

The server 130 receives feedback logs from a plurality of clients 110 via the network 140 and stores the feedback logs to a plurality of log archives 119 (e.g., 119A-119N). Each log archive 119 corresponds to a different client 110 from which the server 130 receives feedback logs. The server 130 also stores a plurality of sets of log responses 121 (e.g., 121A-121N). Each set of log responses 121 corresponds to a different client 110 to which the server 130 transmits the set of log responses 121. Each log can be associated with a unique client ID (such as a universally unique identifier (UUID) or globally unique identifier (GUID)) corresponding to a particular client 110. Each client 110 can facilitate the communication with the server 130. The client is able to perform operations such as upload, edit, and delete and the server 130 will provide responses, such as whether or not the client actions were successful. In other embodiments, the described features can be implemented with a more proactive server 130 that pushes updates out to clients 110, or where user emails are used in place of a unique client ID.

The set of log responses 121 transmitted to a client 110 includes responses to one or more of the feedback logs received from the client 110. A log response to a feedback log can include various content created by the software developer/company for resolving the problems/issues discussed in the feedback log, such as instructions as to how to resolve the problems/issues, links to webpages for resolving the problems/issues, a video showing how to resolve the problems/issues, and the like. The set of log responses 121 can be transmitted to a client 110 using the unique client ID associated with the client 110 and/or a user email associated with the client 110.

Context Engine

Figure 2:
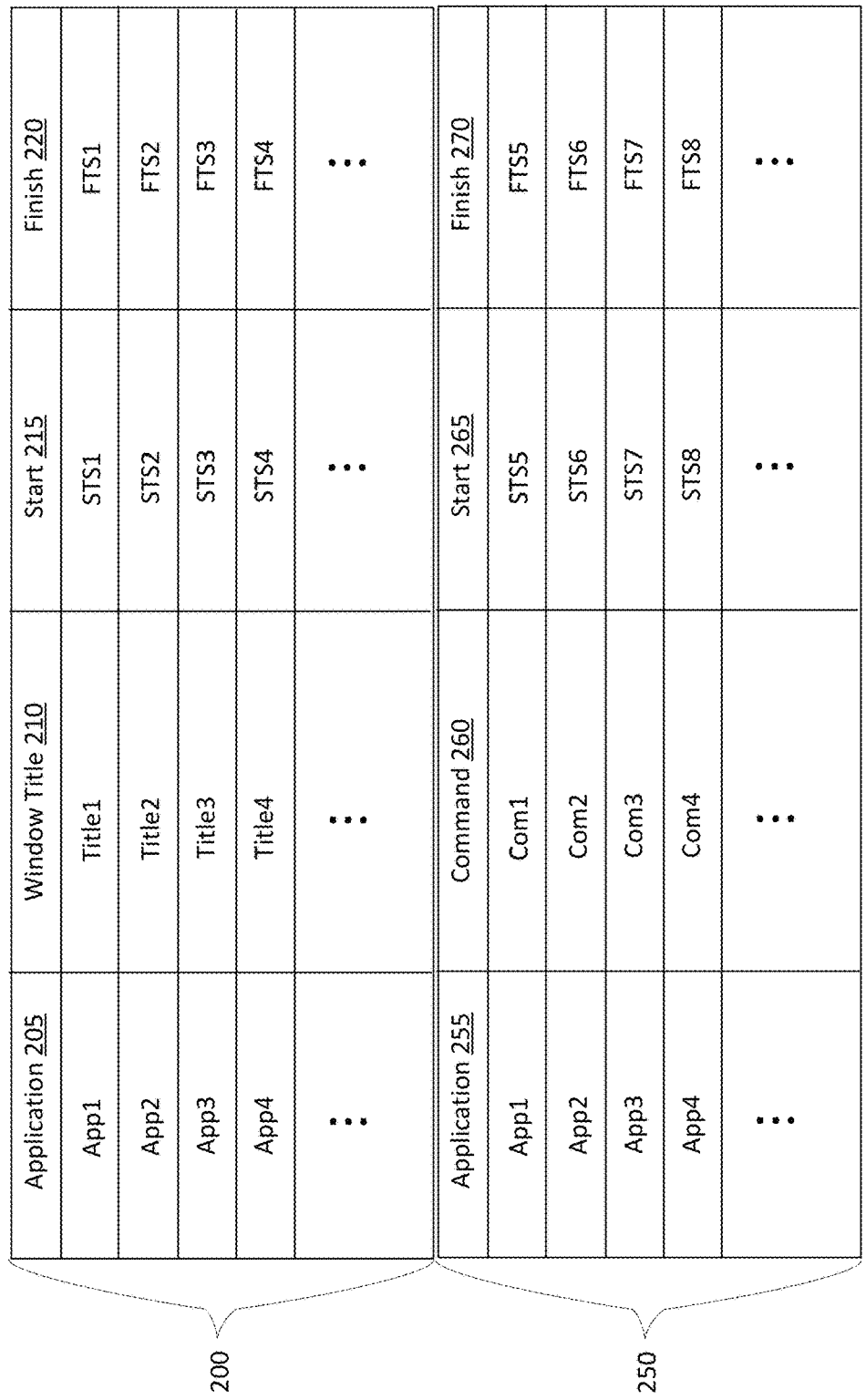
FIG. 2 is a conceptual diagram of the context table of FIG. 1, according to various embodiments.

As discussed above, the context engine 114 interacts with the operating system 127 of the client 110 to collect context information for the multiple software applications 125 and store the collected context information to the context table 115. FIG. 2 is a conceptual diagram of the context table of FIG. 1, according to various embodiments. In general, the context table 115 can comprise any type of data structure for storing data. As shown, the context table 115 includes two separate sections, an application section 200 and a command activity section 250.

The application section 200 stores application context information (application-based context information) for currently open and executing software applications 125 on the client 110. The application section 200 comprises a plurality of entries, each entry representing a particular executing software application 125 on the client 110. Each entry comprises a plurality of data fields 205-220, including an application field 205, a window title field 210, a start time field 215, and a finish time field 220. The application field 205 specifies the name of the executing software application 125. The window title field 210 specifies the title of the application window currently open in the executing software application 125, such as an application filename. The start time field 215 specifies a start time stamp (STS) that specifies the time that the executing software application 125 was opened/loaded (started executing). The finish time field 220 specifies a finish time stamp (FTS) that specifies the time that the executing software application 125 was closed (stopped executing).

The command activity section 250 stores command activity context information (command-based context information) for executed commands of the currently open and executing software applications 125 on the client 110. An executed command of a software application 125 comprises a command that is requested by the user and performed by the software application 125, such as copy, paste, rotate image, insert image, reformat file, save file, etc. The command activity section 250 comprises a plurality of entries, each entry representing a particular command executed by a particular software application 125. Each entry comprises a plurality of data fields 255-270, including an application field 255, a command field 260, a start time field 265, and a finish time field 270. The application field 255 specifies the name of the software application 125 that executes the command. The command field 260 specifies the name of the executed command. The start time field 265 specifies a start time stamp (STS) that specifies the time that the command began execution (such as the time the user request for the command was received by the client 110). The finish time field 270 specifies a finish time stamp (FTS) that specifies the time that the command finished executing (completed execution).

The context engine 114 continually collects context information from the operating system 127 and stores the collected context information to the context table 115. To save storage space, the context engine 114 can also continually delete older context information from the context table 115, such as context information older than 1 hour, 2 hours, or 1 day.

Trigger Engine

As discussed above, while the context engine 114 collects and stores context information to the context table 115, the trigger engine 116 continuously monitors the user inputs received by the client 110 via the input devices (such as a keyboard or mouse) to determine whether a predetermined trigger (predetermined set of user inputs) is received. Receiving a predetermined trigger indicates that the user wishes to trigger the feedback engine 112 to generate a new feedback log to capture a moment of frustration with the primary application. In some embodiments, there are one or more predetermined triggers that can initiate the feedback engine 112 to generate a new feedback log. Each predetermined trigger corresponding to a predetermined set of user inputs. In some embodiments, there are different types of triggers, including cursor-based triggers, hotzone-based triggers, button-based triggers, keyboard-based triggers, and/or natural-based triggers.

Figure 3:
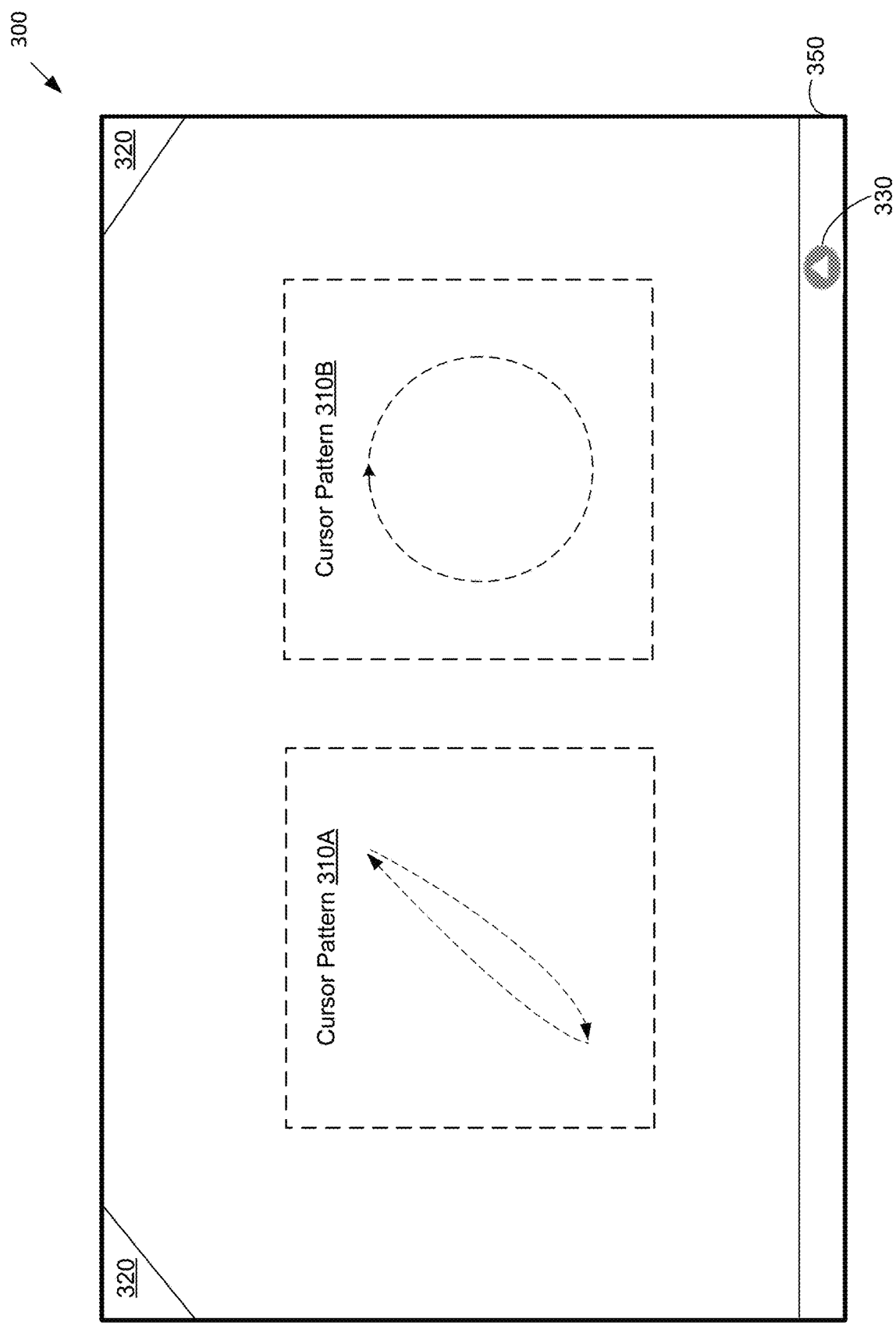
FIG. 3 is an exemplar graphical user interface that is implemented on the client of FIG. 1 and displays different types of predetermined triggers, according to various embodiments.

FIG. 3 is an exemplar graphical user interface that is implemented on the client of FIG. 1 and displays different types of predetermined triggers, according to various embodiments. The desktop 300 can be displayed on the client 110 by the operating system 127 of the client 110. The predetermined triggers include cursor-based triggers 310, hotzone-based triggers 320, and/or button-based triggers 330 performed by the user on the desktop 300 via an input device (such as a mouse or trackball).

The cursor-based triggers comprise triggers that are initiated by the user moving the cursor in a predetermined cursor pattern 310 (e.g., 310A and 310B). Each cursor pattern 310 specifies a predetermined cursor pattern performed by the user via in input device (such as a mouse or trackball). For example, a first cursor pattern 310A can comprise a back and forth cursor shaking movement. As another example, a second cursor pattern 310B can comprise a circular cursor movement pattern. In other embodiments, a cursor pattern 310 can comprise other cursor movements, such as "X" cursor pattern, a star cursor pattern, or the like.

The hotzone-based triggers 320 comprise triggers that are initiated by the user moving the cursor into one or more predetermined hotzones 320 on the desktop 300 via an input device. In the example of FIG. 3, the hotzones 320 are placed in the upper corners of the desktop 300. In other embodiments, the hotzones 320 are placed in other regions of the desktop 300, such as the upper corners of the desktop 300, the side edges of the desktop 300, and the like. In some embodiments, the hotzones 320 are not visually indicated in the desktop 300. In other embodiments, the hotzones 320 are visually indicated in the desktop 300.

The button-based triggers 330 comprise triggers that are initiated by the user selecting an on-screen trigger button icon 330. In the example of FIG. 3, the trigger button icon 330 is placed in the taskbar 350 on the lower edge of the desktop 300. In other embodiments, the trigger button icon 330 is placed in another region of the desktop 300.

The keyboard-based triggers (not shown) comprise triggers that are initiated by the user inputting a predetermined set of key strokes/presses via a keyboard input device. Each predetermined set of key strokes/presses comprise specific user interactions with a keyboard that would not be triggered during typical typing patterns. In some embodiments, a predetermined set of key strokes/presses can comprise the user hitting/inputting a particular key several times rapidly and consecutively in a row, such as the hitting the "ESC" key 3 times rapidly in a row, or the user hitting the "Alt" key 3 times rapidly in a row. In other embodiments, a predetermined set of keypresses can comprise the user hitting/inputting a particular key for a predetermined threshold period of time (a long press), such as the hitting the "ESC" key for 3 or more seconds. In further embodiments, a predetermined set of keypresses can comprise the user hitting/inputting a particular combination of keys at the same time, such as hitting the "Command"+"Shift"+"F" keys at the same time or hitting the "Control"+"Shift"+"F" keys at the same time.

The natural-based triggers (not shown) comprise triggers that are initiated by the user via natural or real-world interactions. In some embodiments, a predetermined trigger comprises receiving a set of predetermined trigger words (such as "this is frustrating") via a microphone input device and a voice recognition engine. In other embodiments, a predetermined trigger comprises receiving a predetermined hand or head gesture via an augmented reality (AR) system or virtual reality (VR) system.

Each predetermined trigger corresponds to a predetermined set of user inputs that are specified in the trigger table 117. The trigger engine 116 continuously monitors for and detects predetermined triggers based on the trigger table 117. When the trigger engine 116 detects that a predetermined trigger has been received/initiated, the trigger engine 116 initiates the log engine 118 for generating a new feedback log and populating the new feedback log with various types of content.

Log Engine

Figure 4:
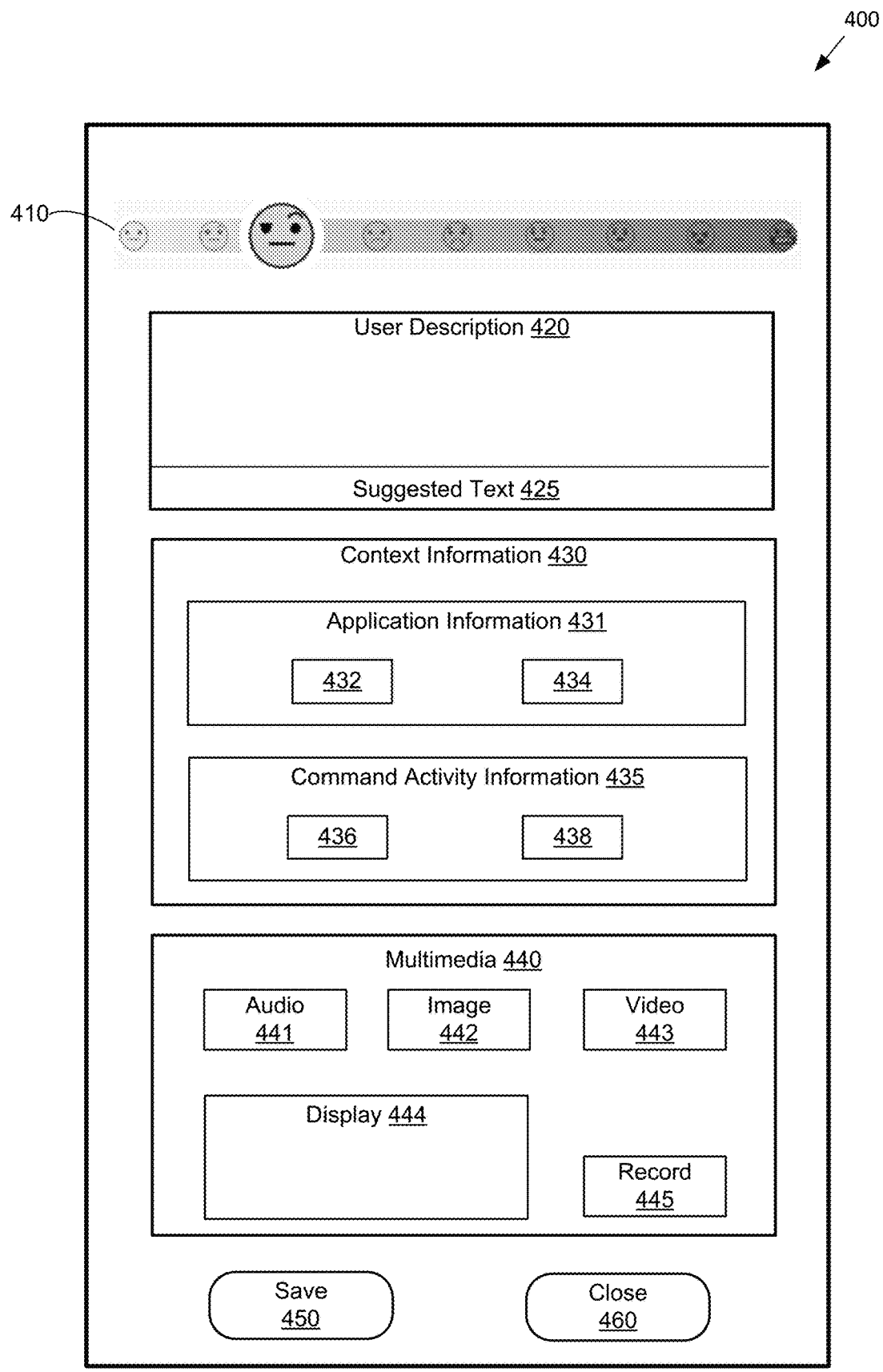
FIG. 4 illustrates an exemplar graphical user interface generated by the log engine of FIG. 1, according to various embodiments.

Upon being initiated by the trigger engine 116, the log engine 118 generates a new feedback log that is displayed via a log user interface. FIG. 4 illustrates an exemplar graphical user interface generated by the log engine of FIG. 1, according to various embodiments. As shown, the log user interface 400 includes an importance level indicator 410, a user description section 420, a context section 430, and a multimedia section 440, a save icon 450, and a close icon 460. The new feedback log can be populated with different types of content, including an importance level, a user description that is manually entered by the user, context information that is automatically collected by the context engine 114, and/or multimedia content, as discussed below.

The importance level indicator 410 visually illustrates the importance level of the new feedback log from a lowest level (such as level 1) to a highest level (such as level 10). The importance level indicator 410 can indicate the how important the particular problem/issue with the primary application is to the user, and can correlate to a frustration level that the user is currently experiencing with the particular software problem/issue. In some embodiments, the importance level indicator 410 visually illustrates the frustration level of the user via colors (such as yellow, orange, red, etc.), graphics (such as smiley face, frowning face, angry face, etc.) and/or animations. In some embodiments, the user can directly change the importance level by interacting with the importance level indicator 410. In these embodiments, the importance level indicator 410 also comprises an interactive element (such as a slider) that the user can select and interact to increase or decrease the importance level.

Upon being initiated, the log engine 118 can initially set the importance level to the lowest level by default (such as level 1). Then the log engine 118 can change the importance level based on further user inputs. In some embodiments, a first instance of receiving the predetermined set of user inputs triggers the log engine 118 to generate the new feedback log having a lowest importance level, and then repeated instances of receiving the same predetermined set of user inputs can repeatedly increase the importance level of the new feedback log, which is visually indicated by the importance level indicator 410.

In some embodiments, if the predetermined set of user inputs comprises a cursor-based trigger that is initiated by the user moving the cursor in a predetermined cursor pattern 310, the user can repeatedly increase the importance level of the new feedback log by repeatedly performing the predetermined cursor pattern 310. For example, if the predetermined set of user inputs (the trigger) comprises the user moving the cursor in a circular movement pattern (the second cursor pattern 310B in FIG. 3), the user can increase the importance level to 2 by repeating the circular movement pattern, increase the importance level to 3 by again repeating the circular movement pattern, and so forth. Each increase of the importance level of the new feedback log is visually indicated by the importance level indicator 410.

In other embodiments, if the predetermined set of user inputs comprises a hotzone-based trigger that is initiated by the user moving the cursor into a hotzone 320, the user can repeatedly increase the importance level of the new feedback log by repeatedly moving the cursor in and out of the hotzone, whereby each repetition increases the importance level by 1 level, which is visually indicated by the importance level indicator 410. In other embodiments, if the predetermined set of user inputs comprises a button-based trigger 330 that is initiated by the user selecting the trigger button icon 330, the user can repeatedly increase the importance level of the new feedback log by repeatedly selecting the trigger button icon 330, whereby each repetition increases the importance level by one level, which is visually indicated by the importance level indicator 410.

In other embodiments, if the predetermined set of user inputs comprises a keyboard-based trigger that is initiated by the user inputting a predetermined set of keypresses, the user can repeatedly increase the importance level of the new feedback log by repeatedly inputting the predetermined set of keypresses. For example, if the predetermined set of user inputs (the trigger) comprises the user hitting the "ESC" key 3 times rapidly in a row, the user can increase the importance level to 2 by repeating the hitting of the "ESC" key 3 times, increase the importance level to 3 by again repeating the hitting the "ESC" key 3 times, and so forth. Each increase of the importance level of the new feedback log is visually indicated by the importance level indicator 410.

As discussed above, prior approaches were incapable of effectively capturing the user's frustration at the moment the user encounters a problem/issue with the software application. In other words, since conventional feedback techniques do not capture the feedback of the user at the moment the user experiences a frustrating problem/issue, the conventional feedback techniques do not accurately capture a level of frustration experienced by the user at the moment the user experiences the frustrating problem/issue with the software application. Advantageously, in the disclosed techniques, the frustration level (level of importance) of the user is more accurately captured at the moment the user encounters the software problem/issue relative to prior approaches (by increasing the level of importance if the user repeatedly inputs the predetermined trigger, which indicates higher levels of importance/frustration).

The user description section 420 of the log user interface 400 is configured to receive the user's text description of the particular problem/issue that the user is currently experiencing with the primary application. The user can also enter a user email associated with the client 110 via the user description section 420 (such as for receiving log responses 121). The user description section 420 can also display suggested text 425 that the user can select to add to the text description. In some embodiments, the suggested text 425 can be derived from the context information collected for the multiple software applications and stored to the context table 115. The user's text description is added to the new feedback log.

The context section 430 of the log user interface 400 displays various selectable icons for adding various types of context information for the software applications 125 to the new feedback log. The context section 430 displays a first set of selectable icons 431 for adding application context information (application-based context information) to the new feedback log and a second set of selectable icons 435 for adding command activity context information (command-based context information) to the new feedback log.

The first set of selectable icons 431 includes a first icon 432 for selecting no application context information to be added, a second icon 434 for selecting the application context information to be added to the new feedback log. The application context information can include any or all information stored in the application section 200 of the context table 115 that was collected during the predetermined time period prior to receiving the user trigger. For example, application context information can include a list of software applications 125 that were open/executing within the predetermined time period, and for each such software application 125, a window title 210, a start time 215, and/or a finish time 220. In some embodiments, the list of software applications 125 include the primary application and one or more secondary applications.

The second set of selectable icons 435 includes a first icon 436 for selecting no command activity context information to be added, a second icon 438 for selecting the command activity context information to be added to the new feedback log. The command activity context information can include any or all information stored in the command activity section 250 of the context table 115 that was collected during the predetermined time period prior to receiving the user trigger. For example, the command activity context information can include, for one or more software applications 125 included in the list of software applications 125 specified in the application context information, a set of one or more commands executed by the software application 125 within the predetermined time period, a start time 265 for each executed command, and/or a finish time 270 for each executed command.

The log engine 118 can retrieve the user-selected context information from the context table 115 and store the user-selected context information to the new feedback log. In other embodiments, the log engine 118 can automatically retrieve the application and command activity context information from the context table 115 and store the application and command activity context information to the new feedback log, without requiring user selections of the context information.

In some embodiments, only a portion of the context information stored to the context table 115 is retrieved from the context table 115 and included in the new feedback log. In these embodiments, the context information that is retrieved from the context table 115 and included in the new feedback log includes only the context information from the context table 115 that was collected and/or stored during a predetermined time period just prior to receiving the user trigger (predetermined set of user inputs) of the feedback engine 112, such as the context information collected and/or stored during a 10 second period just prior to receiving the user trigger of the feedback engine 112. In other embodiments, the predetermined time period can comprise another amount of time.

The multimedia section 440 of the log user interface 400 displays selectable icons for adding various multimedia content to the new feedback log. In some embodiments, the multimedia section 440 displays a selectable audio icon 441 for generating and adding an audio recording from the user to the new feedback log, an image icon 442 for generating and adding a snapshot image of the current desktop to the new feedback log (for example, to show the applications the user was last interacting with), and a video icon 443 for generating and adding a video of the desktop with audio commentary by the user (for example, to discuss what the user is frustrated about, or what the user is having issues with) to the new feedback log. The multimedia section 440 can also include a display window 444 that displays/playsback a generated image or video to be added to the new feedback log. The multimedia section 440 also includes a start recording icon 445 for beginning an audio recording and/or video recording to be added to the new feedback log. As discussed above, prior approaches generated only text-based feedback. Advantageously, the disclosed techniques can integrate multimedia content into the feedback logs, thus providing richer and more detailed feedback relative to the prior art.

The log user interface 400 also displays a close icon 460 that the user can select for closing the log user interface 400 and quickly ending the feedback process. The user can select the close icon 460 when the user accidently enters a predetermined trigger that initiates the feedback process. The log user interface 400 also displays a save icon 450 that the user can select for storing the new feedback log to the log archive 119A stored on the client device once the user is satisfied with the various content included in the new feedback log. In response to receiving a selection of the save icon 450, the log engine 118 saves the new feedback log to the log archive 119A and initiates the archive engine for displaying archived feedback logs.

Archive Engine

Upon being initiated by the log engine 118, the archive engine 120 generates and displays an archive user interface for displaying archived feedback logs. The user can view previous feedback logs via the archive user interface to review the content of selected feedback logs and get value from the feedback logs, for example, to reflect on their working practices, use the logs as to-do's or reminders to return for later review. The archive user interface displays three different types of windows: overview window, group window, and a log window.

Figure 5:
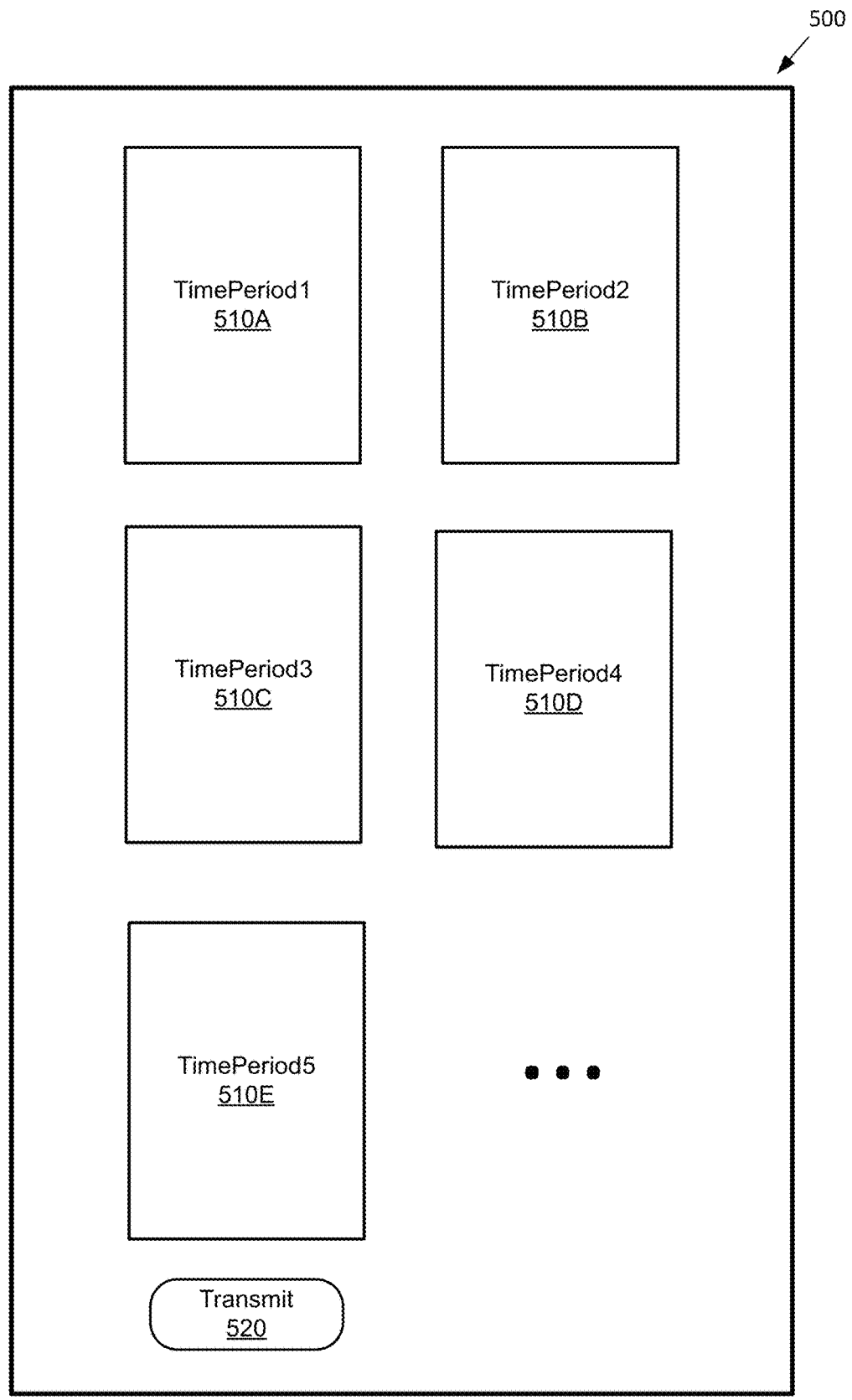
FIG. 5 illustrates an exemplar graphical user interface generated by the archive engine of FIG. 1, according to various embodiments.

FIG. 5 illustrates an exemplar graphical user interface generated by the archive engine of FIG. 1, according to various embodiments. The archive user interface can initially display the overview window 500 when the archive engine 120 is initially triggered. As shown, the overview window 500 displays a plurality of selectable time-period icons 510 (e.g., 51A-510E) and a selectable transmit icon 520.

Each time-period icon 510 represents a particular time period and a group of feedback logs that were generated during the particular time period. In some embodiments, the archive engine 120 transmits the feedback logs to a server 130 of the software developer/company of the primary application at the expiration of predetermined time periods, which correspond to the time periods represented by the time-period icons 510. For example, the archive engine 120 can be configured to transmit the feedback logs to the server 130 at the end of each work day (the predetermined time period comprising a single day), whereby the each time-period icon represents a particular day and a group of feedback logs that were generated during the particular day. In other embodiments, the predetermined time period can comprise a different amount of time, such as 1 hour, 12 hours, 2 days, and the like.

In some embodiments, the archive engine 120 automatically transmits one or more feedback logs to the server 130 based on the importance levels associated with the one or more feedback logs. For example, the archive engine 120 can automatically and periodically transmit a group of feedback logs to the server 130 at predetermined intervals (such as each hour or each day) based on the importance levels associated with the group of feedback logs. For example, the group of feedback logs can be automatically ordered based on the associated importance levels so that the feedback logs having higher importance levels are ordered higher in the group than feedback logs having lower importance levels. Feedback logs that are ordered higher in the group can be listed higher in the group than feedback logs having lower importance levels and/or transmitted before feedback logs having lower importance levels. As another example, the archive engine 120 can automatically and periodically transmit only those feedback logs in the group of feedback logs having associated importance levels that exceed a predetermined threshold importance level (such as 7 on a scale of 1 to 10). As a further example, the archive engine 120 can automatically and immediately transmit a feedback log having an associated importance level that exceeds a predetermined threshold importance level (such as 8 on a scale of 1 to 10). As a further example, the archive engine 120 can automatically and immediately transmit a feedback log having an associated importance level that equals the highest possible importance level (such as 10 on a scale of 1 to 10).

Prior feedback mechanisms generated feedback that did not capture importance or frustration levels associated with the feedback, and did not transmit the feedback to a server based on the associated importance or frustration levels. Advantageously, the disclosed techniques can automatically transmits feedback logs to the server 130 based on the importance levels associated with the feedback logs, which provides a technological improvement over the prior art. In this manner, the disclosed techniques can flag/highlight those feedback logs having relatively high importance levels to the software developer/company. Therefore, the software developer/company receives valuable insight into which particular problems/issues of their software applications are causing the highest levels of user frustration and are incentivized to address the particular problems/issues of their software applications and/or respond to the user regarding the corresponding feedback log. In some embodiments, a feedback log having an associated importance level that exceeds a threshold importance level indicates to the software developer/company that the user wishes to receive a response 121 from the software developer/company regarding the feedback log. Such high importance feedback logs can trigger the server 130, for example, to automatically create a response request or a support ticket for being contacted by a support person for direct help. Server 130 can transmit the log response 121 to a client 110 using the unique client ID associated with the client 110 and/or a user email associated with the client 110. Therefore, submitting the feedback logs to the server can directly benefit both the software developer/company and the user.

In other embodiments, in addition to or alternative to automatically transmitting the feedback logs to the server 130 at predetermined intervals, the user can manually transmit the feedback logs to the server 130 via the transmit icon 520. For example, the user can select a particular time-period icon 510 and select the transmit icon 520 to immediately transmit the group of feedback logs associated with the selected time-period icon 510 to the server 130.

Figure 6:
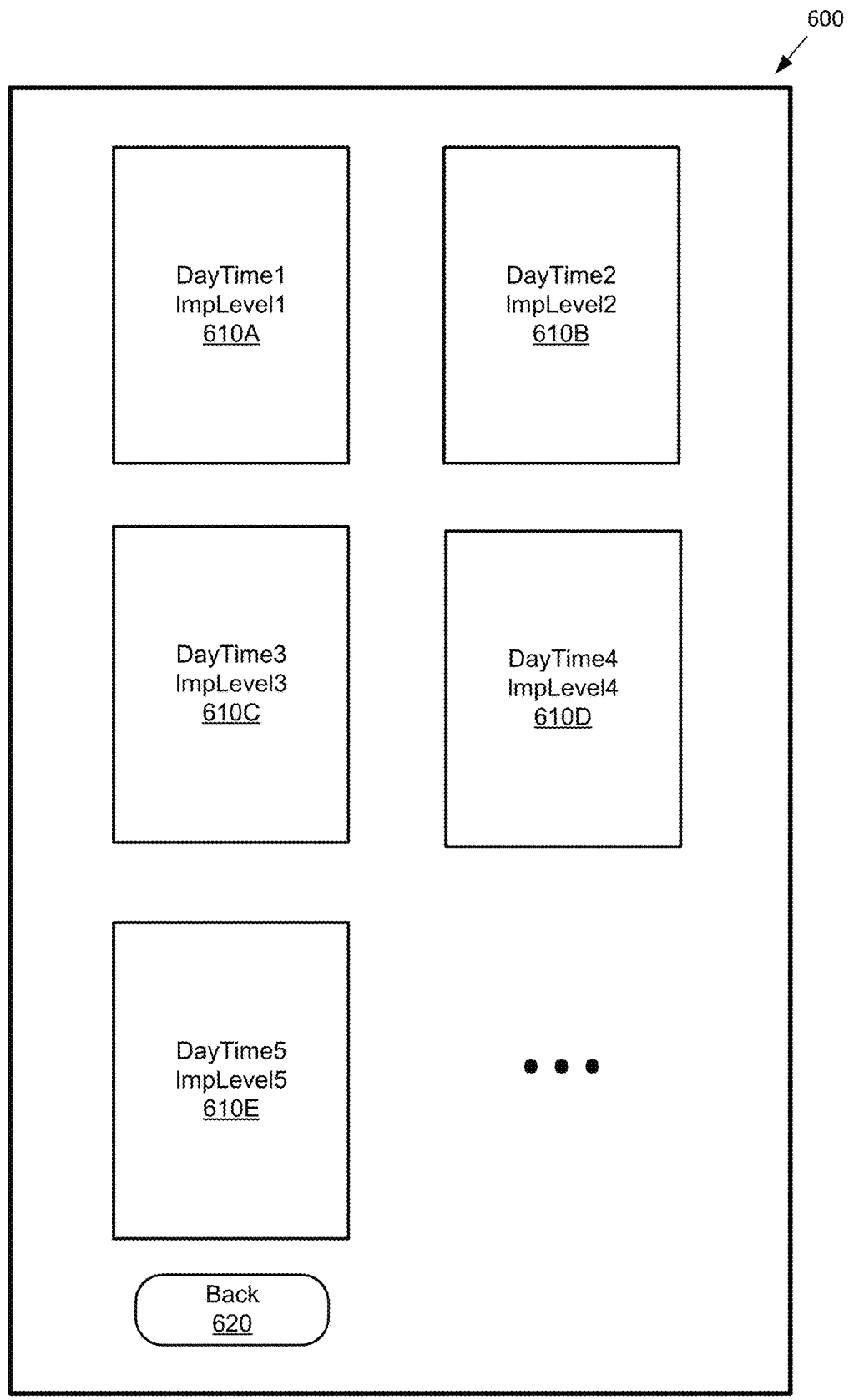
FIG. 6 illustrates an exemplar graphical user interface generated by the archive engine of FIG. 1, according to various embodiments.

When the user selects (e.g., double clicks) a particular time-period icon 510 representing a particular time period and group of feedback logs, the archive user interface displays a group window that includes a plurality of selectable log icons representing the feedback logs included in the group of feedback logs. FIG. 6 illustrates an exemplar graphical user interface generated by the archive engine of FIG. 1, according to various embodiments. As shown, the group window 600 displays a plurality of selectable log icons 610 (e.g., 61A-610E) and a selectable back icon 620. The user can select the back icon 620 to return to the overview window 500.

Each log icon 610 represents a particular feedback log included in the selected group of feedback logs. Each log icon 610 can display a brief summary of the corresponding feedback log, such as a day/time the corresponding feedback log was generated, an importance level associated with the corresponding feedback log, and/or a portion of the user description of the corresponding feedback log. The log icons 610 can be ordered in the group window 600 based on the importance levels associated with the corresponding feedback logs or ordered in the group window 600 based on the day/time the corresponding feedback logs were generated. In this manner, the group window 600 can order the feedback logs included in the group of feedback logs based on the importance level associated with the feedback logs or the day/time the feedback logs were generated.

Figure 7:
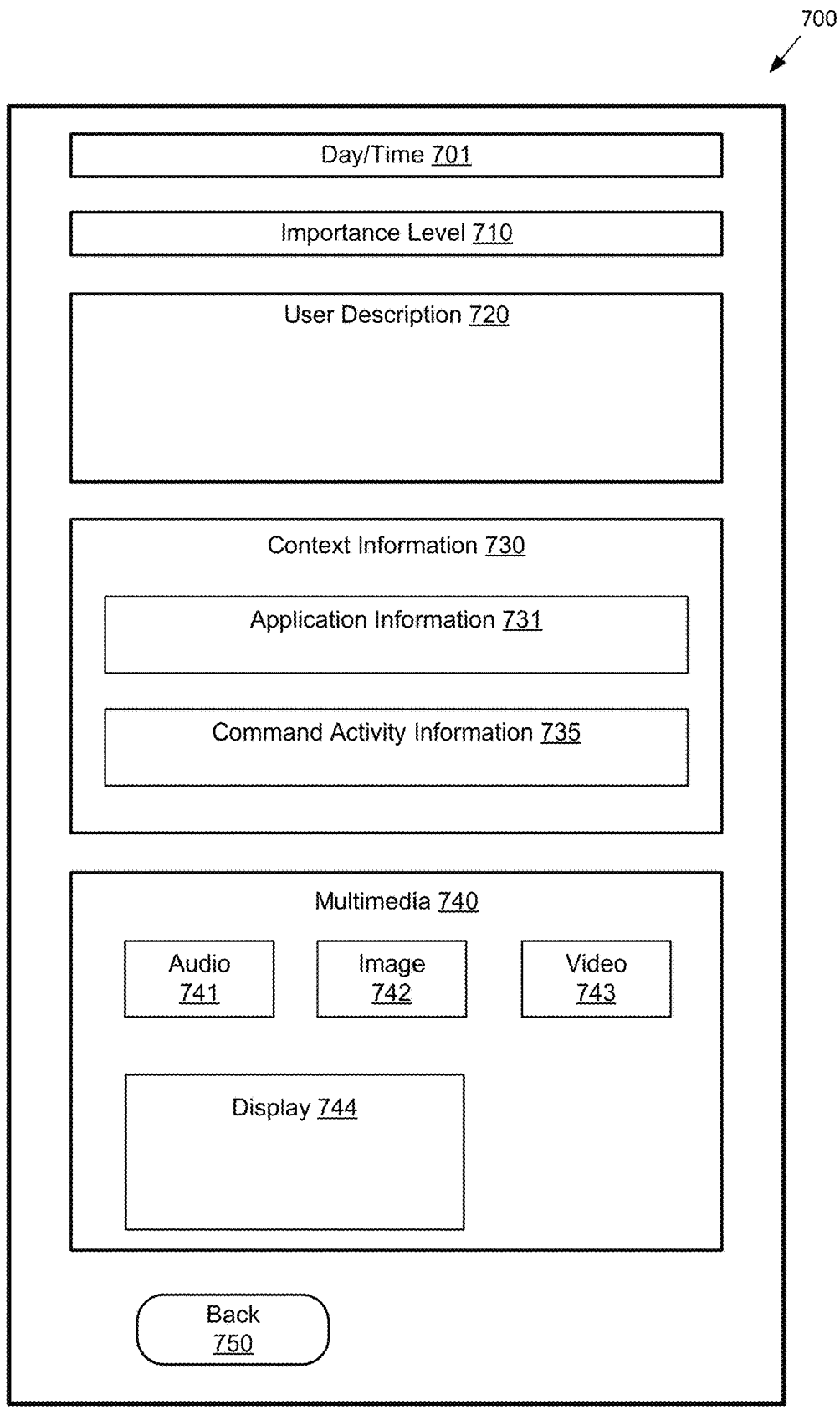
FIG. 7 illustrates an exemplar graphical user interface generated by the archive engine of FIG. 1, according to various embodiments.

When the user selects (e.g., double clicks) a particular log icon 610 representing a particular feedback log, the archive user interface displays a log window that displays the various content of the particular feedback log. FIG. 7 illustrates an exemplar graphical user interface generated by the archive engine of FIG. 1, according to various embodiments. As shown, the log window 700 displays the various content of the particular feedback log, including a day/time 701, an importance level 710, a user description 720, context information 730, and/or multimedia content 740, and a selectable back icon 750.

The user can select the back icon 750 to return to the group window 600. The day/time 701 specifies the day and time the feedback log was generated. The importance level 710 specifies the value of the importance level associated with the feedback log. The user description 720 displays the user's text description of the software problem/issue that was encountered when the user trigger was received and the feedback log was generated.

The context information 730 includes application context information (application-based information) 731 and command activity context information (command-based information) 735. The application context information 731 can specify the application context information previously added to the feedback log via the log user interface 400, such as a list of software applications 125 that were open/executing within the predetermined time period, and for each such software application 125, a window title 210, a start time 215, and/or a finish time 220. The command activity context information 735 can specify the command activity context information previously added to the feedback log via the log user interface 400, such as, for one or more software applications 125 included in the list of software applications 125, a set of one or more commands executed by the software application 125 within the predetermined time period, a start time 265 for each executed command, and/or a finish time 270 for each executed command.

The multimedia content 740 can display selectable icons for playing back multimedia content included in the feedback log, including an audio icon 741 for playing back an audio recording, an image icon 742 for displaying a snapshot image, and a video icon 743 for playing back a video and audio commentary. The multimedia content 740 can also include a display window 744 that displays a snapshot image or plays back a video included in the feedback log.

Technique for Software Application Feedback

Figure 8:
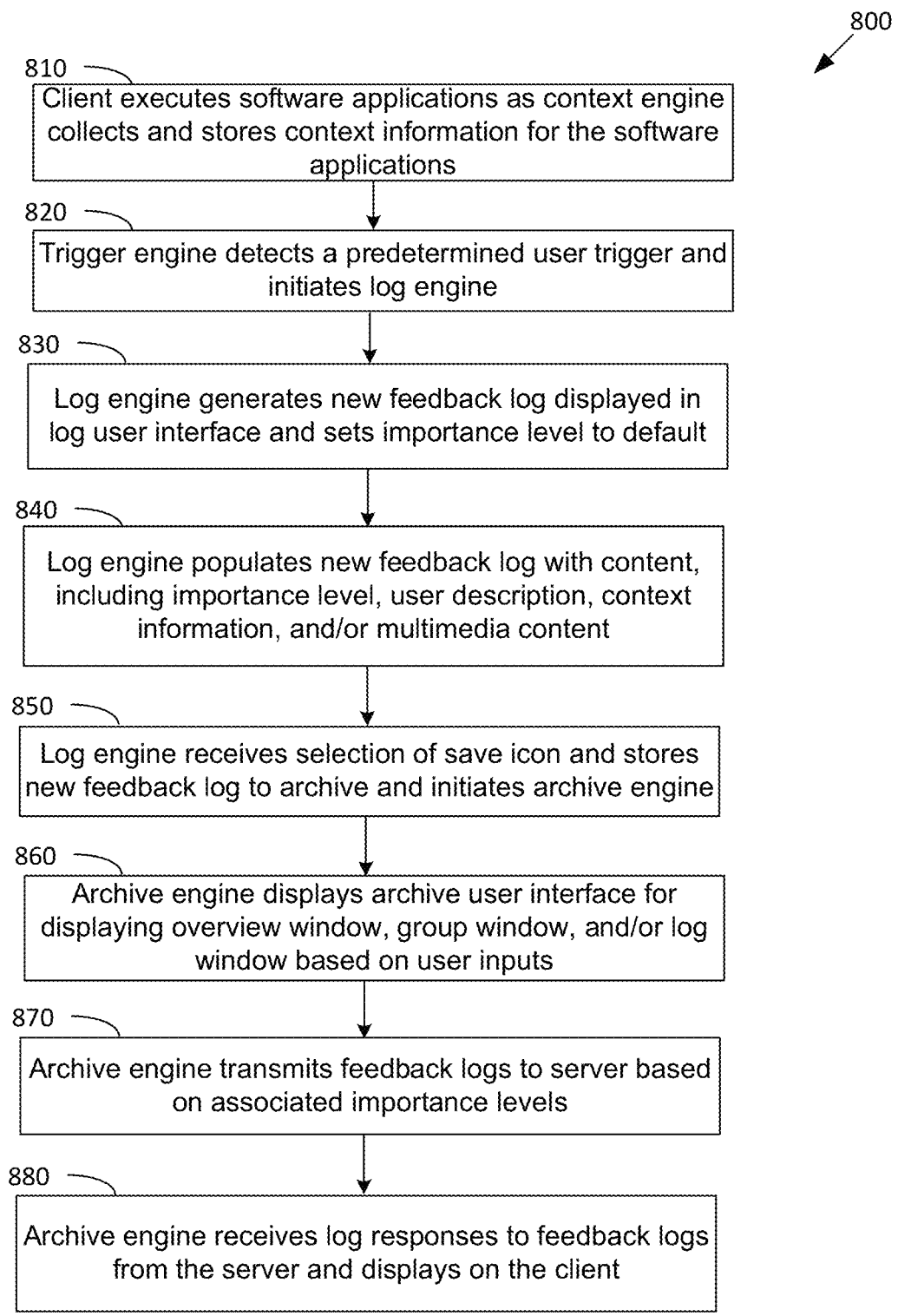
FIG. 8 is a flow diagram of method steps for generating feedback logs for a software application executing on a client device, according to various embodiments.

FIG. 8 is a flow diagram of method steps for generating feedback logs for a software application executing on a client device, according to various embodiments. Although the method steps are described in conjunction with the systems of FIGS. 1-7, persons skilled in the art will understand that the method steps can be performed in any order by any system. In some embodiments, the steps of the method 800 can be performed by a feedback application/engine 112 that includes a context application/engine 114, a trigger application/engine 116, a log application/engine 118, and an archive application/engine 120.

The method 800 begins at step 810 when the client 110 executes one or more software applications 125 as the context engine 114 continuously collects and stores context information (application context information and command activity context information) for the one or more software applications 125 to a context table 115. In some embodiments, the one or more software applications 125 comprises a plurality of different software applications 125 that include a primary application and at least one secondary application with which the primary application interacts for performing a workflow task. The context engine 114 can collect the context information by interacting with the operating system 127 of the client 110.

The trigger engine 116 then detects (at step 820) that a predetermined user trigger (i.e., a predetermined set of user inputs specified in the trigger table 117) is received via an input device, and in response to the predetermined user trigger, initiates the log engine 118. Upon being initiated, the log engine 118 generates (at step 830) a new feedback log that is displayed in a log user interface 400 and sets an importance level associated with the new feedback log to a default level (such as a lowest level).

The log engine 118 then populates (at step 840) the new feedback log with one or more different types of content, such as the associated importance level, a user description (including a user email associated with the client 110), context information, and/or multimedia content. The log engine 118 can repeatedly receive the same predetermined user trigger, which repeatedly increases the importance level. The user description can comprise a text description that is manually entered by the user. The context information is retrieved from the context table 115 and can include application context information and command activity context information for one or more software application 125 that was collected in a predetermined time period just before the user trigger is detected. In some embodiments, the context information includes application context information and command activity context information for the primary application and at least one secondary application. The multimedia content can include audio content, image content, and/or video content.

The log engine 118 then receives (at step 850) a selection of the save icon 450, and in response, stores the new feedback log to a log archive 119A on the client 110 and initiates the archive engine 120. Upon being initiated, the archive engine 120 generates and displays (at step 860) an archive user interface for displaying an overview window 500, a group window 600, and/or a log window 700 based on inputs received from the user. The overview window 500 displays a plurality of selectable time-period icons, each time-period icon representing a particular time period and a group of feedback logs that were generated during the particular time period. When the user selects a particular time-period icon in the overview window 500, the archive engine 120 displays a group window 600 that displays a plurality of selectable log icons representing the feedback logs included in the group of feedback logs. When the user selects a particular log icon representing a particular feedback log, the archive engine 120 displays the log window 700 that displays the various content of the particular feedback log, including the associated importance level value, a user text description, context information, and/or multimedia content.

The archive engine 120 transmits (at step 870) one or more feedback logs from the log archive 119A to a server 130 of the software developer/company for the primary application. In some embodiments, the archive engine 120 transmits the one or more feedback logs to the server 130 based on the importance levels associated with the one or more feedback logs. For example, the archive engine 120 can periodically transmit the feedback logs and order the feedback logs based on the associated importance levels. As another example, the archive engine 120 can periodically transmit only those feedback logs having associated importance levels that exceed a predetermined threshold importance level. As a further example, the archive engine 120 can immediately transmit a feedback log having an associated importance level that equals the highest possible importance level. In some embodiments, a feedback log having an associated importance level that exceeds a threshold importance level indicates to the software developer/company that the user wishes to receive a log response from the primary developer/company regarding the feedback log.

The archive engine 120 then receives (at step 880) one or more log responses 121A to the one or more feedback logs from the server 130 and displays the one or more log responses on the client 110. A log response to a feedback log can include various content created by the software developer/company for resolving the problems/issues discussed in the feedback log. Server 130 can transmit the log response 121 to a client 110 using the unique client ID associated with the client 110 and/or a user email associated with the client 110. The method 800 then ends.

Exemplary Client and Server Machines

Figure 9:
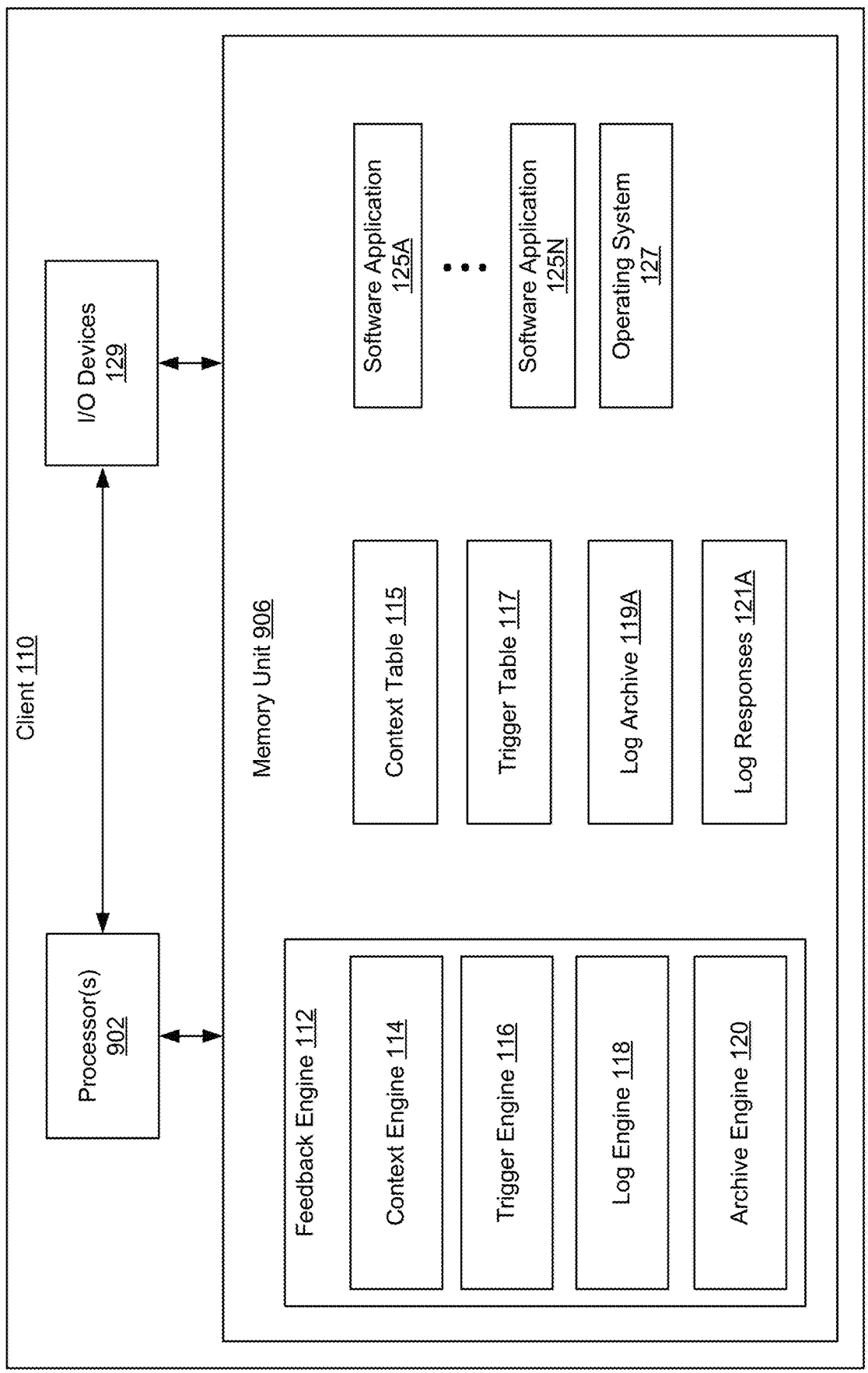
FIG. 9 illustrates an exemplary client device that can be implemented within the system of FIG. 1, according to various embodiments.

FIG. 9 illustrates an exemplary client device that can be implemented within the system of FIG. 1, according to various embodiments. The client 110 can comprise a computing device or machine, such as a desktop computer, laptop computer, or any other type of computing device suitable for practicing various embodiments. The client 110 comprises at least one processor 902, input/output (I/O) devices 129, and a memory unit 906, coupled together via a bus. The client 110 is coupled to a network 140 via a network interface (not shown). The network 140 can comprise any technically feasible communications or information network, wired or wireless, that allows data exchange, such as a wireless (Wi-Fi) network, personal area network (such as Bluetooth, Wireless USB, IrDA, etc.), wide area network (WAN), a local area network (LAN), and/or the Internet, among others.

In general, a processor 902 may be any technically feasible processing device or hardware unit capable of processing data and executing software applications and program code. The processor 902 executes the software and performs the functions and operations set forth in the embodiments described herein. For example, a processor 902 can comprise a central processing unit (CPU), a graphics processing unit (GPU), a digital signal processor (DSP), an application-specific integrated circuit (ASIC), a field programmable gate array (FPGA) or other programmable logic device, discrete gate or transistor logic, discrete hardware components, or any combination of different processing units, such as a CPU configured to operate in conjunction with a GPU.

The memory unit 906 can include a hard disk, a random access memory (RAM) module, a flash memory unit, or any other type of memory unit or combination thereof. Processor and I/O devices read data from and write data to memory 906. The memory unit 906 is configured to store software application(s) and data. Instructions from the software constructs within the memory unit 906 are executed by processors to enable the operations and functions described herein. In various embodiments, the memory unit 906 is configured to store a feedback application/engine 112 (a context application/engine 114, a trigger application/engine 116, a log application/engine 118, and an archive application/engine 120), a context table 115, a trigger table 117, a log archive 119A, a set of log responses 121A, a plurality of software applications 125, and an operating system 127 for performing embodiments herein. The processor 902 is configured to execute the various applications and data to provide an underlying functionality of a feedback mechanism system as described in various embodiments herein.

I/O devices 129 are also coupled to memory 906 and can include input devices capable of receiving user inputs, such as a keyboard, a mouse, a trackball, a camera for inputting images and/or video, a microphone for inputting audio, and so forth, as well as output devices capable of providing output, such as a display, speaker, and so forth. Additionally, I/O devices can include devices capable of both receiving input and providing output, such as an augmented reality (AR) system, virtual reality (VR) system, touchscreen, a universal serial bus (USB) port, and so forth.

Figure 10:
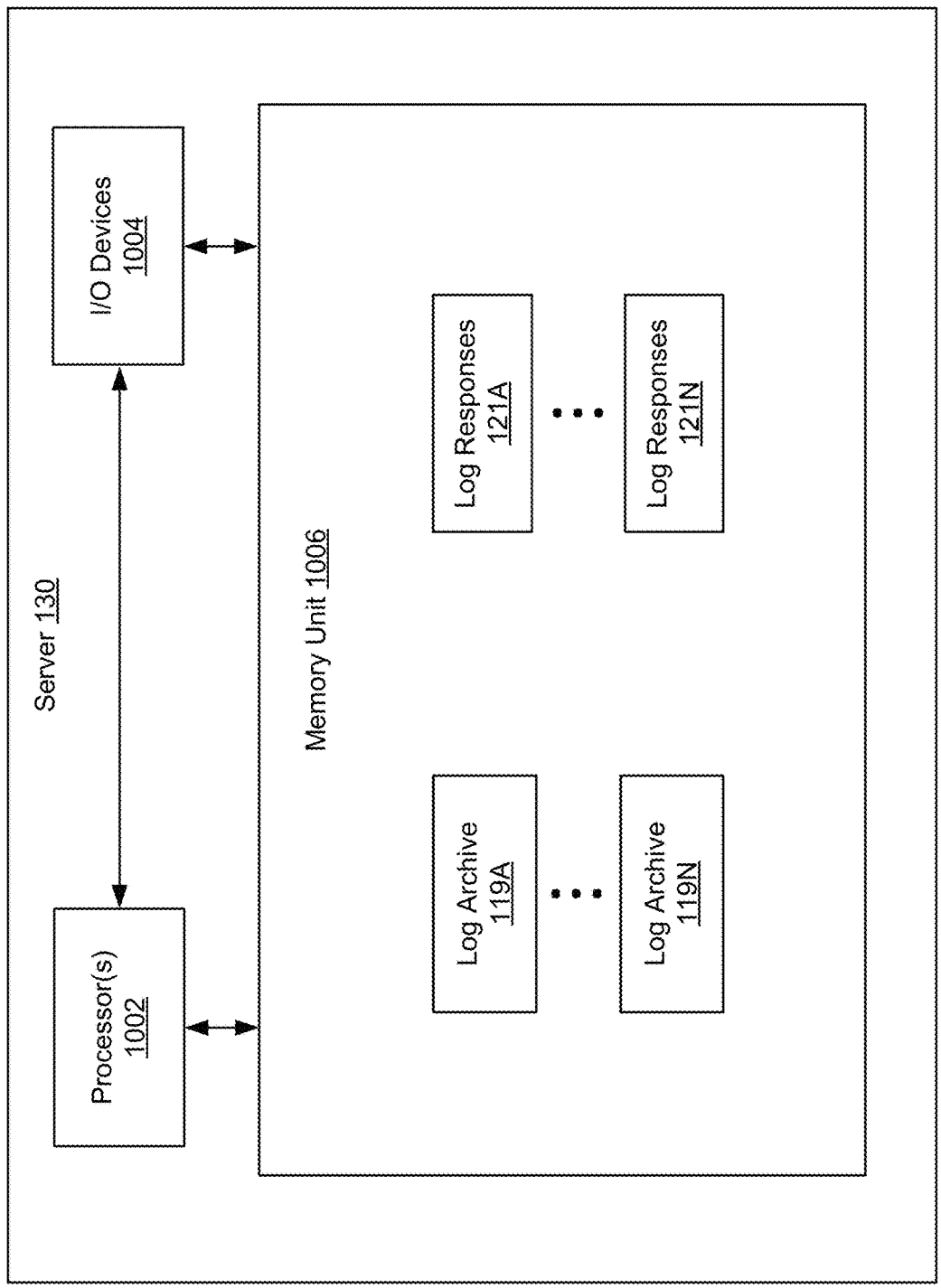
FIG. 10 illustrates an exemplary server device that can be implemented within the system of FIG. 1, according to various embodiments.

FIG. 10 illustrates an exemplary server device that can be implemented within the system of FIG. 1, according to various embodiments. The server 130 can be owned and/or operated by the software developer/company of at least one software application 125 executing on the client device 110. The server 130 can comprise a computing device or machine, such as a server system, desktop computer, laptop computer, or any other type of computing device suitable for practicing various embodiments. The server 130 comprises at least one processor 1002, input/output (I/O) devices 1004, and a memory unit 1006, coupled together. The server 130 is coupled to a network 140 via a network interface (not shown). The network 140 can comprise any technically feasible communications or information network, wired or wireless, that allows data exchange, such as a wireless (Wi-Fi) network, personal area network (such as Bluetooth, Wireless USB, IrDA, etc.), wide area network (WAN), a local area network (LAN), and/or the Internet, among others.

In general, a processor 1002 may be any technically feasible processing device or hardware unit capable of processing data and executing software applications and program code. The processor 1002 executes the software and performs the functions and operations set forth in the embodiments described herein. For example, a processor 1002 can comprise a central processing unit (CPU), a graphics processing unit (GPU), a digital signal processor (DSP), an application-specific integrated circuit (ASIC), a field programmable gate array (FPGA) or other programmable logic device, discrete gate or transistor logic, discrete hardware components, or any combination of different processing units, such as a CPU configured to operate in conjunction with a GPU.

The memory unit 1006 can include a hard disk, a random access memory (RAM) module, a flash memory unit, or any other type of memory unit or combination thereof. Processor and I/O devices read data from and write data to memory 1006. The memory unit 1006 is configured to store software application(s) and data. Instructions from the software constructs within the memory unit 1006 are executed by processors to enable the operations and functions described herein. In various embodiments, the memory unit 1006 is configured to store a plurality of log archives 119 (e.g., 119A-119N) and a plurality of sets of log responses 121 (e.g., 121A-121N) for performing embodiments herein.

I/O devices 1004 are also coupled to memory 1006 and can include devices capable of receiving input, such as a keyboard, a mouse, a trackball, and so forth, as well as devices capable of providing output, such as a monitor/display, speaker, and so forth. Additionally, I/O devices can include devices capable of both receiving input and providing output, such as a touchscreen, a universal serial bus (USB) port, and so forth. In particular, the I/O devices may further include a display monitor that displays the W-graph GUI, W-suggest GUI, or any other type of GUI.

In sum, a feedback mechanism/engine is provided that reports software issues between users of software applications and the developers of the software applications. The feedback mechanism/engine generates feedback logs that capture moments of user frustration when a user encounters problems/issues with using a particular software application executing on a client device. The feedback mechanism/engine can be triggered to generate a feedback log by the user via a predetermined set of user inputs (such as a predetermined set of key presses) at the moment the user experiences the frustrating moment. Once the feedback mechanism/engine is triggered for the particular software application, the generated feedback log can capture an importance level indicator, a user description, context information (such as application context information and command context information) for the particular software application and the context information for one or more other software applications that interacted with the particular software application. The feedback log can also capture multimedia content such as audio, images, and videos. The feedback log is then transmitted to a server of a software developer of the particular software application.

In particular, the feedback mechanism/engine includes a context engine, a trigger engine, a log engine, and an archive engine executing on a client device. The user can perform a particular workflow task by using multiple software applications executing on the client device, the multiple software applications including a primary application and one or more secondary applications with which the primary application interacts. The context engine can interact in the background with an operating system of the client device to collect context information for the multiple software applications and store the context information to a context table. The collected and stored context information can include a list of open/loaded software applications (such as the multiple software applications) and a set of executed commands for each software application, along with associated timestamps.

While the context engine collects and stores context information in the background, the trigger engine continuously monitors the user inputs received by the client device via input devices (such as a keyboard or mouse) to determine whether a predetermined set of user inputs (such as a predetermined set of keyboard inputs) is received. Receiving the predetermined set of user inputs indicates that the user is experiencing a problem/issue with the primary application and wishes to trigger the feedback mechanism/engine to generate a feedback log for the primary application. In response to detecting that the predetermined set of user inputs is received, the trigger engine initiates the log engine.

Upon being initiated, the log engine generates a new feedback log that is displayed via a log user interface. The log user interface includes an importance level indicator, a description section, a context section, and a multimedia section. The importance level indicator visually illustrates the importance level of the new feedback log from a lowest level (such as 1) to a highest level (such as 10). Upon being initiated, the log engine can initially set the importance level to the lowest level. Then the log engine can change the importance level based on user inputs. For example, the first instance of receiving the predetermined set of user inputs triggers the feedback mechanism/engine to generate the new feedback log having a lowest importance level, and repeated instances of receiving the predetermined set of user inputs can repeatedly increase the importance level of the new feedback log, which is visually indicated by the importance level indicator. The importance level indicator can indicate the how important the particular problem/issue with the primary application is to the user, and can correlate to a frustration level that the user is currently experiencing with the particular problem/issue.

The description section of the log user interface is configured to receive the user's text description of the particular problem/issue that the user is currently experiencing with the primary application. The description section can also display suggested text that the user can select to add to the user's text description. In some embodiments, the suggested text can be derived from the context information collected for the multiple software applications. The user's text description is added to the new feedback log.

The context section of the log user interface displays various selectable icons for adding various context information for the multiple software applications to the new feedback log. The log engine can retrieve the desired context information from the context table and store to the new feedback log. In some embodiments, only a portion of the context information stored to the context table 115 is retrieved from the context table 115 and included in the new feedback log. In some embodiments, the context information included in the new feedback log includes context information collected during a predetermined time period just prior to receiving the user trigger of the feedback mechanism/engine, such as context information collected during a 10 second period just prior to receiving the user trigger of the feedback mechanism/engine. The context section can display an application icon for adding a list of software applications that were open/executing during the predetermined time period to the new feedback log. The context section can also display an activity icon for adding, for each software application open/executing during the predetermined time period, a set of commands received from the user and executed by the software application during the predetermined time period to the new feedback log. In other embodiments, the log engine can automatically add by default the above context information for the multiple software applications to the new feedback log.

The multimedia section of the log user interface displays various selectable icons for adding various multimedia content to the new feedback log. For example, the multimedia section can display a selectable image icon for generating and adding a snapshot image of the current desktop to the new feedback log. As another example, the multimedia section can display a selectable video icon for generating and adding a video of the desktop with audio commentary by the user to the new feedback log.

Thus, the new feedback log can be populated with various types of content, including an importance level, a text description that is manually entered by the user, context information that is automatically collected by the context engine 114, and/or multimedia content. The log user interface also displays a save icon that the user can select for storing the new feedback log to a log archive stored on the client device once the user is satisfied with the various content included in the new feedback log. In response to receiving a selection of the save icon, the log engine saves the new feedback log to the log archive and initiates the archive engine, which generates and displays an archive user interface for displaying archived feedback logs.

The archive user interface can initially display an overview window that includes a plurality of selectable time-period icons, each time-period icon representing a particular time period and a group of feedback logs that were generated during the particular time period. In some embodiments, the archive engine transmits the feedback logs to a server of the software developer/company of the primary application at the expiration of predetermined time periods, which correspond to the time periods represented by the time-period icons. For example, the archive engine can be configured to transmit the feedback logs to the server at the end of each work day (the predetermined time period comprising 1 day), whereby the each time-period icon represents a particular day and a group of feedback logs that were generated during the particular day. In other embodiments, the predetermined time period can comprise a different amount of time, such as 1 hour, 12 hours, 2 days, and the like.

When the user selects a particular time-period icon representing a particular time period and group of feedback logs, the archive engine displays a group window that displays a plurality of selectable log icons representing the feedback logs included in the group of feedback logs. Each log icon represents a particular feedback log included in the selected group of feedback logs. The log icons can be ordered in the group window based on the importance levels associated with the corresponding feedback logs or ordered in the group window based on the time the corresponding feedback logs were generated. When the user selects a particular log icon representing a particular feedback log, the archive engine displays a log window that displays the various content of the particular feedback log, including an importance level value, a user text description, context information, and/or multimedia content.

In some embodiments, the archive engine transmits one or more feedback logs to a server of the software developer/company based on the importance levels associated with the one or more feedback logs. For example, the archive engine can periodically transmit a group of feedback logs to the server at predetermined intervals based on the importance levels associated with the group of feedback logs. In this manner, the feedback engine can flag/highlight those feedback logs having relatively high importance levels to the software developer/company and can send a response to the client regarding the high importance feedback logs. Therefore, submitting the feedback logs to the server can directly benefit both the software developer/company and the user.

At least one technical advantage of the disclosed techniques relative to the prior art is that the disclosed techniques enable a feedback log to be generated that includes context information (such as a set of recent commands) that is associated with multiple software applications executing on a client device. After the feedback log is generated, the feedback log can be transmitted to a server machine associated with a company or software developer that is responsible for at least one of software applications executing on the client device. In this manner, companies and software developers are able to receive valuable information and insights about the operations and interactions between their software applications and other software applications. Thus, the disclosed techniques increases the ability of the software developer/company to improve the interactions between their software applications and other software applications relative to prior approaches that cannot capture context information for multiple software applications. Another technical advantage of the disclosed techniques relative to the prior art is that the disclosed techniques provide a feedback mechanism that can be triggered by the user to generate a feedback log via a predetermined set of user inputs. Consequently, the disclosed techniques are capable of capturing user feedback at the very moment the user experiences a frustrating problem/issue with a software application, which increases the accuracy, quality, and quantity of the feedback received by the software developers, thus increasing the ability of the software developers/companies to improve their software applications relative to prior approaches. Another technical advantage of the disclosed techniques relative to the prior art is that the disclosed techniques provide a feedback mechanism that generates a feedback log that can include multimedia content, such as images and videos. Consequently, the disclosed techniques are capable of capturing more detailed and rich user feedback than conventional approaches that capture only text-based user feedback, thereby increasing the ability of the software developers/companies to improve their software applications relative to prior approaches. These technical advantages provide one or more technological advancements over prior art approaches.

Aspects of the subject matter described herein are set out in the following numbered clauses.

1. In some embodiments, a computer-implemented method for generating feedback logs for software applications executing on client devices, the method comprising: querying an operating system for context information associated with a plurality of software applications executing on a client device; storing the context information within a context data structure; receiving a first instance of a predetermined set of inputs via an input device; in response, generating a feedback log that is populated with at least a portion of the context information stored within the context data structure; and transmitting the feedback log to a server machine.

2. The computer-implemented method of clause 1, wherein the at least a portion of the context information populating the feedback log includes context information that was stored within the context data structure during a predetermined time period prior to receiving the first instance of the predetermined set of inputs.

3. The computer-implemented method of any of clauses 1-2, wherein the context information includes, for each software application included in the plurality of software applications, at least one of an application name, window title, an execution start time, or an execution stop time.

4. The computer-implemented method of any of clauses 1-3, wherein the context information includes, for each software application included in the plurality of software applications, a set of commands executed by the software application.

5. The computer-implemented method of any of clauses 1-4, wherein the plurality of software applications includes at least a primary application and a secondary application that interact to perform a workflow task.

6. The computer-implemented method of any of clauses 1-5, further comprising: in response to receiving the first instance of the predetermined set of inputs, assigning a first importance level to the feedback log; receiving a second instance of the predetermined set of inputs via the input device; and In response to receiving the second instance of the predetermined set of inputs, assigning a second importance level to the feedback log.

7. The computer-implemented method of any of clauses 1-6, further comprising: assigning an importance level to the feedback log that indicates that a log response has been requested for the feedback log; and receiving the log response for the feedback log from the server machine.

8. The computer-implemented method of any of clauses 1-7, wherein the predetermined set of inputs comprises at least one of a predetermined set of key strokes or a predetermined cursor pattern.

9. The computer-implemented method of any of clauses 1-8, further comprising storing multimedia content to the feedback log, wherein the multimedia content comprises at least one of audio content, image content, or video content.

10. The computer-implemented method of any of clauses 1-9, further comprising: storing the feedback log within a log archive that includes a plurality of feedback logs; and generating a user interface for interacting with and displaying the plurality of feedback logs.

11. In some embodiments, one or more non-transitory computer-readable media including instructions that, when executed by one or more processors, cause the one or more processors to generate feedback logs for software applications executing on client devices by performing the steps of: querying an operating system for context information associated with a plurality of software applications executing on a client device; storing the context information within a context data structure; receiving a first instance of a predetermined set of inputs via an input device; in response, generating a feedback log that is populated with at least a portion of the context information stored within the context data structure; and transmitting the feedback log to a server machine.

12. The one or more non-transitory computer-readable media of clause 11, wherein the at least a portion of the context information populating the feedback log includes context information that was stored within the context data structure during a predetermined time period prior to receiving the first instance of the predetermined set of inputs.

13. The one or more non-transitory computer-readable media of any of clauses 11-12, wherein the context information includes, for each software application included in the plurality of software applications, at least one of an application name, window title, an execution start time, or an execution stop time.

14. The one or more non-transitory computer-readable media of any of clauses 11-13, wherein the context information includes, for each software application included in the plurality of software applications, a set of commands executed by the software application, and for each command in the set of commands, at least one of an execution start time or an execution completion time.

15. The one or more non-transitory computer-readable media of any of clauses 11-14, wherein the plurality of software applications includes at least a primary application and a secondary application that interact to perform a workflow task.

16. The one or more non-transitory computer-readable media of any of clauses 11-15, further comprising: receiving a second instance of the predetermined set of inputs via the input device; assigning an importance level to the feedback log based on receiving the second instance of the predetermined set of inputs.

17. The one or more non-transitory computer-readable media of any of clauses 11-16, further comprising: assigning an importance level to the feedback log that indicates that a log response has been requested for the feedback log; and receiving the log response for the feedback log from the server machine.

18. The one or more non-transitory computer-readable media of any of clauses 11-17, wherein the predetermined set of inputs comprises at least one of a cursor-based set of inputs, a desktop region-based set of inputs, a button-based set of inputs, a keyboard-based set of inputs, or a natural-based set of inputs.

19. The one or more non-transitory computer-readable media of any of clauses 11-19, further comprising storing multimedia content to the feedback log, wherein the multimedia content comprises at least one of audio content, image content, or video content.

20. In some embodiments, a computing system comprising: a memory that stores instructions; and a processor that is coupled to the memory and, upon executing the instructions, performs the steps of: querying an operating system for context information associated with a plurality of software applications executing on a client device; storing the context information within a context data structure; receiving a first instance of a predetermined set of inputs via an input device; in response, generating a feedback log that is populated with at least a portion of the context information stored within the context data structure; and transmitting the feedback log to a server machine.

Any and all combinations of any of the claim elements recited in any of the claims and/or any elements described in this application, in any fashion, fall within the contemplated scope of the embodiments and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. Aspects of the present embodiments can be embodied as a system, method, or computer program product. Accordingly, aspects of the present disclosure can take the form of an entirely hardware embodiment, an entirely software embodiment (including firmware, resident software, and micro-code, etc.) or an embodiment combining software and hardware aspects that can all generally be referred to herein as a "module," a "system," or a "computer." In addition, any hardware and/or software technique, process, function, component, engine, module, or system described in the present disclosure can be implemented as a circuit or set of circuits. Furthermore, aspects of the present disclosure can take the form of a computer program product embodied in one or more computer readable media having computer readable program codec embodied thereon.

Any combination of one or more computer readable media can be utilized. Each computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory, a read-only memory, an erasable programmable read-only memory, a Flash memory, an optical fiber, a portable compact disc read-only memory, an optical storage device, a magnetic storage device, or any suitable combination of the foregoing. In the context of this document, a computer readable storage medium can be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors can be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure can be devised without departing from the basic scope thereof, and the scope thereof is determined by the claims that follow.

We claim:

1. A computer-implemented method for generating feedback logs for software applications executing on client devices, the method comprising:
    querying an operating system for context information associated with a plurality of software applications executing on a client device;

storing the context information within a context data structure;

receiving a first instance of a predetermined set of inputs via an input device;

in response, generating a feedback log that is populated with at least a portion of the context information stored within the context data structure; and transmitting the feedback log to a server machine.

2. The computer-implemented method of claim 1, wherein the at least a portion of the context information populating the feedback log includes context information that was stored within the context data structure during a predetermined time period prior to receiving the first instance of the predetermined set of inputs.

3. The computer-implemented method of claim 1, wherein the context information includes, for each software application included in the plurality of software applications, at least one of an application name, window title, an execution start time, or an execution stop time.

4. The computer-implemented method of claim 1, wherein the context information includes, for each software application included in the plurality of software applications, a set of commands executed by the software application.

5. The computer-implemented method of claim 1, wherein the plurality of software applications includes at least a primary application and a secondary application that interact to perform a workflow task.

6. The computer-implemented method of claim 1, further comprising:
   in response to receiving the first instance of the predetermined set of inputs, assigning a first importance level to the feedback log;
   receiving a second instance of the predetermined set of inputs via the input device; and
   In response to receiving the second instance of the predetermined set of inputs, assigning a second importance level to the feedback log.

7. The computer-implemented method of claim 1, further comprising:
   assigning an importance level to the feedback log that indicates that a log response has been requested for the feedback log; and
   receiving the log response for the feedback log from the server machine.

8. The computer-implemented method of claim 1, wherein the predetermined set of inputs comprises at least one of a predetermined set of key strokes or a predetermined cursor pattern.

9. The computer-implemented method of claim 1, further comprising storing multimedia content to the feedback log, wherein the multimedia content comprises at least one of audio content, image content, or video content.

10. The computer-implemented method of claim 1, further comprising:
    storing the feedback log within a log archive that includes a plurality of feedback logs; and
    generating a user interface for interacting with and displaying the plurality of feedback logs.

11. One or more non-transitory computer-readable media including instructions that, when executed by one or more processors, cause the one or more processors to generate feedback logs for software applications executing on client devices by performing the steps of:
    querying an operating system for context information associated with a plurality of software applications executing on a client device;
    storing the context information within a context data structure;
    receiving a first instance of a predetermined set of inputs via an input device;
    in response, generating a feedback log that is populated with at least a portion of the context information stored within the context data structure; and
    transmitting the feedback log to a server machine.

12. The one or more non-transitory computer-readable media of claim 11, wherein the at least a portion of the context information populating the feedback log includes context information that was stored within the context data structure during a predetermined time period prior to receiving the first instance of the predetermined set of inputs.

13. The one or more non-transitory computer-readable media of claim 11, wherein the context information includes, for each software application included in the plurality of software applications, at least one of an application name, window title, an execution start time, or an execution stop time.

14. The one or more non-transitory computer-readable media of claim 11, wherein the context information includes, for each software application included in the plurality of software applications, a set of commands executed by the software application, and for each command in the set of commands, at least one of an execution start time or an execution completion time.

15. The one or more non-transitory computer-readable media of claim 11, wherein the plurality of software applications includes at least a primary application and a secondary application that interact to perform a workflow task.

16. The one or more non-transitory computer-readable media of claim 11, further comprising:
    receiving a second instance of the predetermined set of inputs via the input device;
    assigning an importance level to the feedback log based on receiving the second instance of the predetermined set of inputs.

17. The one or more non-transitory computer-readable media of claim 11, further comprising:
    assigning an importance level to the feedback log that indicates that a log response has been requested for the feedback log; and
    receiving the log response for the feedback log from the server machine.

18. The one or more non-transitory computer-readable media of claim 11, wherein the predetermined set of inputs comprises at least one of a cursor-based set of inputs, a desktop region-based set of inputs, a button-based set of inputs, a keyboard-based set of inputs, or a natural-based set of inputs.

19. The one or more non-transitory computer-readable media of claim 11, further comprising storing multimedia content to the feedback log, wherein the multimedia content comprises at least one of audio content, image content, or video content.

20. A computing system comprising:
    a memory that stores instructions; and
    a processor that is coupled to the memory and, upon executing the instructions, performs the steps of:
    querying an operating system for context information associated with a plurality of software applications executing on a client device;
    storing the context information within a context data structure;
    receiving a first instance of a predetermined set of inputs via an input device;

in response, generating a feedback log that is populated with at least a portion of the context information stored within the context data structure; and transmitting the feedback log to a server machine.

\* \* \* \* \*